United States Patent
Golden

(10) Patent No.: US 7,014,825 B2
(45) Date of Patent: *Mar. 21, 2006

(54) PEROVSKITE-TYPE METAL OXIDE COMPOUNDS AND METHODS OF MAKING AND USING THEREOF

(75) Inventor: Stephen J. Golden, Santa Barbara, CA (US)

(73) Assignee: Catalytic Solutions, Inc., Oxnard, CA (US)

(*) Notice: Subject to any disclaimer, the term of this patent is extended or adjusted under 35 U.S.C. 154(b) by 360 days.

This patent is subject to a terminal disclaimer.

(21) Appl. No.: 10/360,385

(22) Filed: Feb. 6, 2003

(65) Prior Publication Data

US 2003/0198582 A1   Oct. 23, 2003

Related U.S. Application Data

(60) Continuation-in-part of application No. 10/006,968, filed on Dec. 4, 2001, now Pat. No. 6,531,425, which is a division of application No. 09/338,443, filed on Jun. 22, 1999, now Pat. No. 6,352,955, which is a continuation-in-part of application No. 08/797,578, filed on Feb. 7, 1997, now Pat. No. 5,977,017, which is a continuation-in-part of application No. 08/630,603, filed on Apr. 10, 1996, now Pat. No. 5,939,354.

(51) Int. Cl.
| | |
|---|---|
| *B01J 8/00* | (2006.01) |
| *B01J 8/02* | (2006.01) |
| *C01B 31/00* | (2006.01) |
| *C01B 31/18* | (2006.01) |
| *C01B 21/00* | (2006.01) |

(52) U.S. Cl. .............. 423/213.2; 423/213.5; 423/239.1; 423/247

(58) Field of Classification Search ............. 423/213.2, 423/213.5, 239.1, 247
See application file for complete search history.

(56) References Cited

U.S. PATENT DOCUMENTS

3,865,752 A   2/1975   Remeika et al (Continued)

FOREIGN PATENT DOCUMENTS

| EP | 0468127 | 1/1992 |
| EP | 0 641 749 A1 | 3/1995 |
| JP | 5-76762 A | 3/1993 |
| JP | 5-154384 A | 6/1993 |

OTHER PUBLICATIONS

Marcilly et al., Preparation of Highly Dispersed Mixed Oxides and Oxide Solid Solutions by Pyrolysis of Amorphous Organ Precursors, *J. Am. Ceram. Soc.*, 53 (1970) 560, no month.

(Continued)

*Primary Examiner*—Stanley S. Silverman
*Assistant Examiner*—Jonas N. Strickland
(74) *Attorney, Agent, or Firm*—Hogan & Hartson, LLP

(57) ABSTRACT

Perovskite-type catalyst consists essentially of a metal oxide composition and methods of using them are provided. The metal oxide composition is represented by the general formula $A_{a-x}B_xMO_b$, in which A is a mixture of elements originally in the form of single phase mixed lanthanides collected from bastnasite; B is a divalent or monovalent cation; M is at least one element selected from the group consisting of elements of an atomic number of from 23 to 30, 40 to 51, and 73 to 80; a is 1 or 2; b is 3 when a is 1 or b is 4 when a is 2; and x is a number defined by $0 \leq x < 0.5$. Methods of making and using the perovskite-type catalysts are also provided. The perovskite-type catalyst may be used to reduce nitrogen oxides, oxidize carbon monoxide, and oxidize hydrocarbons in an exhaust stream from a motor vehicle. Methods of such a use are provided.

20 Claims, 6 Drawing Sheets

U.S. PATENT DOCUMENTS

| | | | |
|---|---|---|---|
| 3,865,923 | A | 2/1975 | Stephens |
| 3,884,837 | A | 5/1975 | Remeika et al. |
| 3,897,367 | A | 7/1975 | Lauder |
| 3,929,670 | A | 12/1975 | Kudo et al. |
| 4,001,371 | A | 1/1977 | Remeika et al. |
| 4,049,583 | A | 9/1977 | Lauder |
| 4,107,163 | A | 8/1978 | Donohue |
| 4,126,580 | A | 11/1978 | Lauder |
| 4,127,510 | A | 11/1978 | Harrison et al. |
| 4,151,123 | A | 4/1979 | McCann, III |
| 4,314,996 | A | 2/1982 | Sekido et al. |
| 4,601,883 | A | 7/1986 | Sekido et al. |
| 4,742,038 | A | 5/1988 | Matsumoto |
| 4,748,143 | A | 5/1988 | Tabata |
| 4,892,862 | A | 1/1990 | Ogushi et al. |
| 4,921,829 | A | 5/1990 | Ozawa et al. |
| 5,318,937 | A | 6/1994 | Jovanovic et al. |
| 5,380,692 | A | 1/1995 | Nakatsuji et al. |
| 5,432,024 | A | 7/1995 | Soma et al. |
| 5,489,483 | A | 2/1996 | Soma et al. |
| 5,622,680 | A | 4/1997 | Monceaux et al. |
| 5,624,542 | A | 4/1997 | Shen et al. |
| 5,686,198 | A | 11/1997 | Kuo et al. |
| 5,932,146 | A | 8/1999 | Kuo et al. |
| 6,165,431 | A | 12/2000 | Mackay et al. |
| 6,531,425 | B1 * | 3/2003 | Golden .................. 502/302 |

OTHER PUBLICATIONS

Libby, Promising Catalyst for Auto Exhaust, *Science*, 171 (1971) 499, no month.

Voorhoeve et al., Rare-Earth Oxides of Manganese and Cobalt Rival Platinum for the Treatment of Carbon Monoxide in Auto Exhaust, *Science*, 177 (Jul., 1972) 353.

Voorhoeve et al., Rare-Earth Manganites: Catalysts with Low Ammonia Yield in the Reduction of Nitrogen Oxides, *Science* 180 (Apr., 1973).

Voorhoeve et al., Perovskite Oxides: Materials Science in Catalysis, *Science*, 195 (Mar., 1977) 827.

Voorhoeve et al., Exploration of Persovskite-Like Catalysts, *Mat. Res. Bull.*, 9 (1974) 655, no month.

Johnson et al., Preparation of High Surface Area Substituted $LaMnO_3$ Catalysts, *Ceramic Bulletin*, 55 (1976) 520, no month.

Baythoun et al., Production of strontium-substituted lanthanum manganite perovskite powder by the amorphous citrate process, *J. Mat. Sci.*, 17 (1982) 2757, no month.

Asamitsu, A structural phase transition induced by an external magnetic field, *Nature*, 373 (Feb., 1995) 407.

Chakraborty et al., Low-temperature systhesis of ultrafine La0.84 $MnO_3$ powder by an autoignition process, *J. Mat. Res.*, 9 (1994) 986, no month.

Kilbourn, B.T., Lanthanides and Yttrium (Raw Materials for Advanced and Engineered Ceramics), *Cer. Eng. Sc. Proc. By*, __(1985) pp. 1331-1341, no month.

Habashi, F., The Discovery and Industrialization of the Rare Earths, UNOCAL[76]MOLYCORP, (1994), reprinted from CIM Bulletin Jan. and Feb., 1994.

Sakaguchi et al, Electrocatalytic Activity and Oxygen Adsorption Property of Perovskite-type Oxides, *Electrochimica Acta*, 35 (1990) 65, no month.

Meadowcroft, D.B., Low-cost Oxygen Electrode Material, *Nature*, 226 (1970) 847, no month.

Johnson et al., Studies of some Perovskite Oxidation Catalysts Using DTA Techniques, *Thermochimica Acta*, 7 (1973) 303, no month.

Tseung et al, Preparation and Characterization of High Surface Area Semiconducting Oxides, *J. Mater. Sci.*, 5 (1970) 604, no month.

Ni, Yunxiang et al, The atomic arrangement of bastnasite-(Ce), Ce (CO3)F, and structural elements of synchysite-(Ce), rontgenite-(Ce), and parisite-(Ce), *Am. Mineral.*, 78 (1993) 415, no month.

M. Fleischer, Relative Proportions of the Lanthanides in Minerals of the Bastnaesite Group, *Can. Mineral*, 16 (1978) 361, no month.

Ohbayashi et al., Crystallographic, Electric and Thermochemical Properties of the Perovskite-Type $Ln_{1-x}Sr_xCoO_3$(Ln: Lanthanoid Element), *Japanese Journal of Applied Physics*, vol. 13, No..1, Jan. 1974, 1-7.

Taylor, Automobile Catalytic Converters, *Springer-Verlag.*, 1984, pp. 4, 5, 11, no month.

Heck and Farrauto, Automobile Catalysts, *Automotive Engineering*, Feb. 1996, 93-96.

Narula et al., Materials Chemistry Issues Related to Advanced Materials Applications in the Automotive Industry, *Chem. Mater*, vol. 8, No. 5, 1996, 984-1003, no month.

Voorhoeve et al., Defect Chemistry and Catalysis in Oxidation and Reduction Over Perovskite-Type Oxides, *Annals New York Academy of Science*, 1976, pp. 3-21, no month.

Viswanathan, CO Oxidation and NO Reduction on Perovskite Oxides, *Catal. Rev.-Sci. Eng.*, 34(4), 337-354 (1992), no month.

Burton & Garten, *Advanced Materials in Catalysis*, Academic Press, New York, 1997, no month.

Nakamura et al., Reduction-Oxidation and Catalytic Properties of $La_{1-x}Sr_xCoO_3$, *Journal of Catalysis*, 83, 151-159 (1983), no month.

Nitadori & Misono, Catalytic Properties of $La_{1-x}$, $A'_xFeO_3$ (A' = $Sr_1$ Ce) and $La_{1-x}Ce_xCoO_3$, *Journal of Catalysis*, 93, 459-466 (1985), no month.

Nitadori et al., Catalytic Properties of $La_{1-x}$, A'x$MnO_3$ (A' = $Sr_1$ Ce, Hf), *Journal of Catalysis*, 98, 221-228 (1986), no month.

Kirk-Othmer, *Encyclopedia of Chemical Technology*, 3ed., vol. 19, 833-838 (1982), no month.

* cited by examiner

FIG. 3  Three-way catalyst (TWC) test

PEROVSKITE-TYPE METAL OXIDE COMPOUNDS AND METHODS OF MAKING AND USING THEREOF

RELATED APPLICATION

This application is a continuation-in-part of application Ser. No. 10/006,968, filed Dec. 4, 2001, now U.S. pat. No. 6,531,425 which is a divisional of application Ser. No. 09/338,443, filed Jun. 22, 1999, now U.S. Pat. No. 6,352,955, which is a continuation-in-part of application Ser. No. 08/797,578, filed on Feb. 7, 1997, now U.S. Pat. No. 5,977,017, which in turn is a continuation-in-part of application Ser. No. 08/630,603, filed on Apr. 10, 1996, now U.S. Pat. No. 5,939,354, which applications are hereby incorporated by reference in their entirety.

BACKGROUND OF THE INVENTION

1. Field of the Invention

The present invention relates generally to perovskite-type catalysts which are useful in carbon monoxide oxidation, hydrocarbon oxidation, nitrogen oxide reduction and oxidation of trapped soot particles. In addition, the present invention relates to perovskite-type materials displaying so-called giant magnetoresistance (GMR). Furthermore, the present invention relates to methods of making and using perovskite-type catalysts and materials.

2. Description of Related Art

Perovskite compositions are nominally designated as $ABO_3$, in which A represents a rare earth metal such as lanthanum, neodymium, cerium or the like, and B represents a transition metal such as cobalt, iron, nickel or the like. It is known in the art that perovskite-type materials are useful for the catalytic oxidation and reduction reactions associated with the control of automotive exhaust emissions. It is also known that perovskite materials (powders, single crystals and thin films) containing Mn on the B-site show giant magnetoresistance effect (GMR), such that on application of a magnetic field, the electrical resistivity of the material drops drastically due to a field-induced switching of the crystal structure. For this reason, GMR has attracted considerable attention for device applications, such as magnetic recording heads.

Several techniques have been used to produce perovskite-type catalyst materials for the treatment of exhaust gases from internal combustion engines. The ability of such materials to effectively treat internal combustion exhaust gases depends on the three-way activity of the material, i.e., the capability for nitrogen oxide reduction, carbon monoxide oxidation and unsaturated and saturated hydrocarbon oxidation. The following patents describe such materials and techniques in the three-way catalytic application: U.S. Pat. Nos. 3,865,752; 3,865,923; 3,884,837; 3,897,367; 3,929,670; 4,001,371; 4,049,583; 4,107,163; 4,126,580; 5,318,937. In particular, Remeika in U.S. Pat. No. 3,865,752 describes the use of perovskite phases incorporating Cr or Mn on the B-site of the structure showing high catalytic activity. Lauder teaches in U.S. Pat. No. 4,049,583 (and U.S. Pat. No. 3,897,367) the formation of single-phase perovskite materials showing good activity for CO oxidation and NO reduction. Tabata in U.S. Pat. No. 4,748,143 teaches the production of single-phase perovskite oxidation catalysts where the surface atomic ratio of the mixed rare earth elements and the transition metal is in the range of 1.0:1.0 to 1.1:1.0. The rare-earth component can be introduced using a mixed rare-earth source called "Lex 70" which has a very low Ce content. Tabata further teaches in U.S. Pat. No. 5,185,311 the support of Pd/Fe by perovskites, together with bulk ceria and alumina, as an oxidation catalyst. The perovskite is comprised of rare earths on the A-site and transition metals on the B-site in the ratio 1:1.

In addition to these patents there are numerous studies reported in the scientific literature relating to the fabrication and application of perovskite-type oxide materials in the treatment of internal combustion exhaust emissions. These references include Marcilly et al., *J. Am. Ceram. Soc.,* 53 (1970) 56; Tseung et al., *J. Mater. Sci.,* 5 (1970) 604; Libby, *Science,* 171 (1971) 449; Voorhoeve et al., *Science,* 177 (1972) 353; Voorhoeve et al., *Science,* 180 (1973); Johnson et al., *Thermochimica Acta,* 7 (1973) 303; Voorhoeve et al., *Mat. Res. Bull.,* 9 (1974) 655; Johnson et al., *Ceramic Bulletin,* 55 (1976) 520; Voorhoeve et al., *Science,* 195 (1977) 827; Baythoun et al., *J. Mat. Sci.,* 17 (1982) 2757; Chakraborty et al., *J. Mat. Res.,* 9 (1994) 986. Much of this literature and the patent literature frequently mention that the A-site of the perovskite compound can be occupied by any one of a number of lanthanide elements (e.g. Sakaguchi et al., *Electrochimica Acta,* 35 (1990) 65). In all these cases, the preparation of the final compound utilizes a single lanthanide, e.g. $La_2O_3$. Meadowcroft, in *Nature,* 226 (1970) 847, refers to the possibility of using a mixed lanthanide source for the preparation of a low-cost perovskite material for use in an oxygen evolution/reduction electrode. U.S. Pat. No. 4,748,143 refers to the use of an ore containing a plurality of rare-earth elements in the form of oxides for making oxidation catalysts.

In addition to the above-mentioned techniques, other techniques have been developed for the production of perovskite materials containing Mn on the B-site which show giant magnetoresistance effect (GMR). Such materials are generally made in the forms of powders, single crystals, and thin films. A common technique is the growth of single-crystal from a phase-pure perovskite source (see, for example, Asamitsu in *Nature,* 373 (1995) 407). All such techniques use a phase-pure perovskite compound with a single lanthanide on the A-site, in addition to an alkaline earth dopant. An example of such phase-pure perovskite compounds is $La_{1-x}Sr_xMnO_3$.

It is also known in the art that it is difficult and expensive to prepare individual rare-earth compounds such as individual lanthanides. The cost is high for making perovskite-type materials with a single lanthanide on the A-site. Therefore, a need exists for using low-cost starting materials to manufacture inexpensive catalyst materials, simultaneously having high temperature stability and high three-way activity for use in conversion of CO, hydrocarbons and oxides of nitrogen in modern gasoline-powered automobiles. A need also exists for the manufacture of bulk materials, thin films and single-crystals of materials showing GMR, using inexpensive starting materials.

SUMMARY OF THE INVENTION

It is an object of the present invention to provide improved catalyst materials with three-way activity, manufactured from inexpensive starting components. It is also an object of the present invention to provide a perovskite-type metal oxide compound having giant magnetoresistance effect. It is further an object of the present invention to provide a method of making and using improved catalyst materials and the perovskite-type metal oxide compounds of the present invention.

Accordingly, one object of the present invention is to provide a perovskite-type catalyst consisting essentially of a metal oxide composition. The metal oxide composition is represented by the general formula $A_{a-x}B_xMO_b$, in which A is a mixture of elements originally in the form of single phase mixed lanthanides collected from bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$.

In a preferred embodiment, the single phase perovskite-type materials of the present invention have a formula $A_{1-x}B_xMO_3$ and preferably x is about 0 to 0.5.

In another preferred embodiment, the single phase materials of the present invention are perovskite-type materials having a formula $A_{2-x}B_xMO_4$.

Another object of the present invention is to provide a perovskite-type metal oxide compound represented by the general formula $A_{a-x}B_xMO_b$, in which A is a mixture of elements originally in the form of single phase mixed lanthanides collected from bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$. The perovskite-type metal oxide compound of the invention contains Mn on its B-site.

The present invention also provides a catalytic converter. The catalytic converter comprises:

(a) a perovskite-type catalyst comprising a metal oxide composition represented by the general formula:

$$A_{1-x}B_xMO_3$$

wherein

A is a mixture of elements originally in the form of a single phase mixed lanthanide collected from bastnasite;

B is a divalent or monovalent cation;

M is at least one element selected from the group consisting of elements of an atomic number of from 22 to 30, 40 to 51, and 73 to 80;

x is a number defined by $0 \leq x < 0.5$; and (b) a solid structure for supporting the catalyst.

In a preferred embodiment, the catalytic converter also comprises a carrier powder. The perovskite-type catalyst may be in a bulk form or in the form of a dispersion.

Another object of the present invention is to provide a method of preparing a perovskite-type catalyst consisting essentially of a metal oxide composition having component elements represented by the general formula $A_{a-x}B_xMO_b$, in which A is a mixture of elements originally in the form of single phase mixed lanthanides collected from bastnasite, B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$.

The method comprises forming a homogeneous mixture of a single phase mixed lanthanide salt collected from bastnasite and respective salts or oxides, of elements B, and M and forming a perovskite-type metal oxide composition from said homogeneous mixture.

A further aspect of the present invention provides a method of making a catalytic converter of the present invention. The method comprises:

(a) providing a perovskite-type catalyst comprising a metal oxide composition represented by the general formula:

$$A_{1-x}B_xMO_3$$

wherein

A is a mixture of elements originally in the form of a single phase mixed lanthanide collected from bastnasite;

B is a divalent or monovalent cation;

M is at least one element selected from the group consisting of elements of an atomic number of from 22 to 30, 40 to 51, and 73 to 80;

x is a number defined by $0 \leq x < 0.5$;

(b) providing a support structure having a surface;

(c) forming a stable slurry suspension of the perovskite-type catalyst; and (d) depositing the suspension of the perovskite-type catalyst on the surface of the support.

In one embodiment of the present invention, the perovskite-type catalyst may be in a bulk form or in the form of a dispersion. A carrier powder may be mixed with the bulk perovskite-type catalyst to form the slurry suspension and then be deposited on the surface of the support. Alternatively, a carrier powder may be used to form a perovskite-type catalyst in the form of a dispersion.

The present invention also provides methods of using the catalysts or catalyst converters of the present invention. In one embodiment, the present invention provides a method of reducing nitrogen oxides, oxidizing carbon monoxide, and oxidizing hydrocarbons in an exhaust stream from a motor vehicle. The method include a step of contacting the exhaust stream with a catalyst or catalyst converter of the present invention. The present invention is further defined in the appended claims and in the following description of preferred embodiments.

BRIEF DESCRIPTION OF THE DRAWINGS

The above-mentioned and other features of the present invention and the manner of obtaining them will become more apparent, and will be best understood by reference to the following description, taken in conjunction with the accompanying drawings. These drawings depict a typical embodiment of the present invention and do not therefore limit its scope. They serve to add specificity and detail in which.

DETAILED DESCRIPTION OF THE INVENTION

Figure 1:
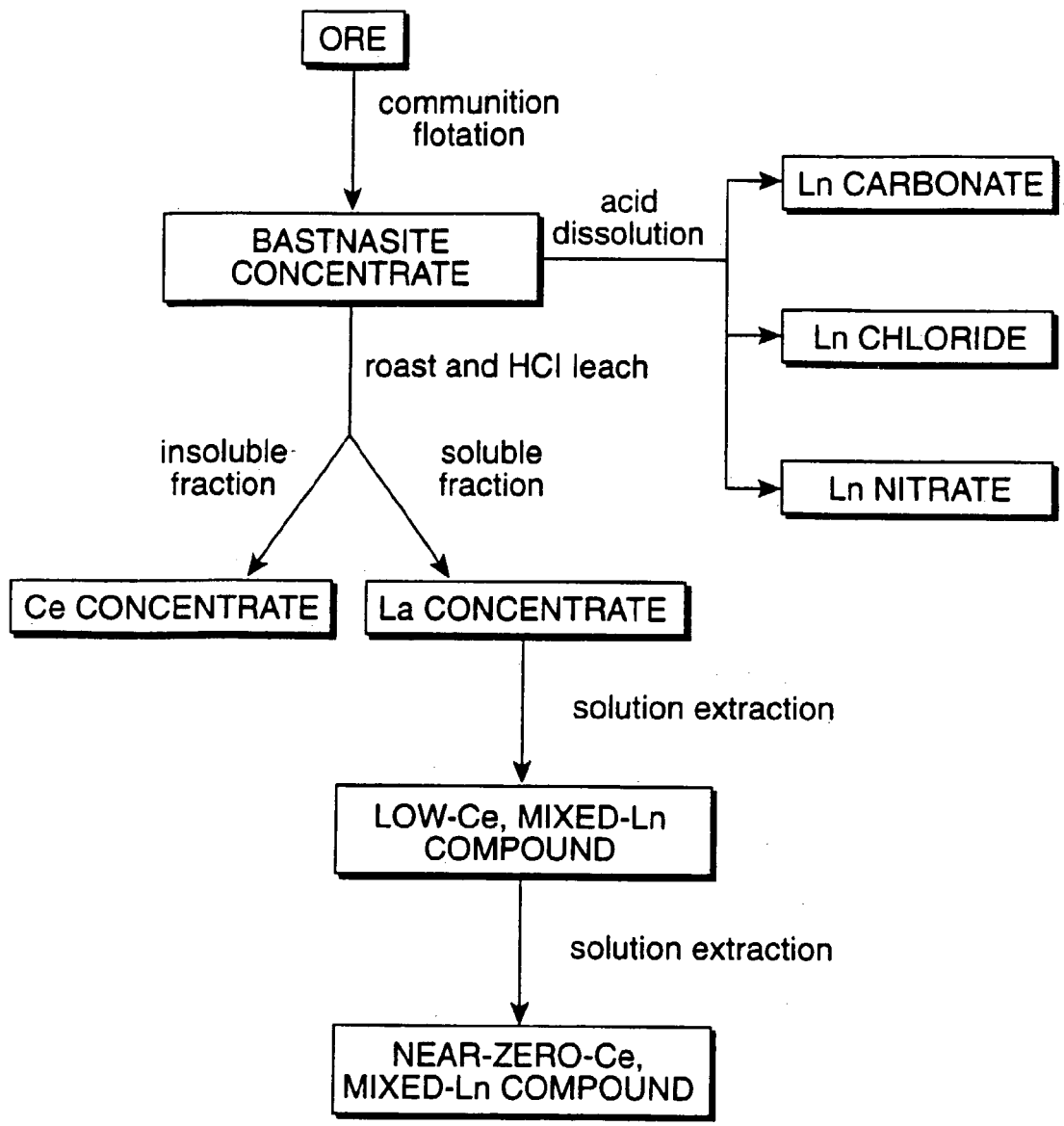
FIG. 1 shows a processing route of bastnasite, and its mixed lanthanide derivatives.

The present invention is based on the discovery that single phase mixed lanthanides collected from bastnasite can be used in making perovskite-type materials. According to the present invention, single phase mixed lanthanides from bastnasite can be used to make perovskite-type catalysts with improved activities. The catalysts of the present invention have three-way activity and can be used for the removal of unsaturated and saturated hydrocarbons, nitrogen oxides and carbon monoxide from the exhaust gases of internal combustion engines and from industrial waste gases. They also exhibit high thermal and chemical stability.

As discussed above, the source of the lanthanide component in prior art is an oxide, carbonate, nitrate or acetate of one lanthanide element, with a high degree of purity with respect to other lanthanides; or a mixture of highly purified lanthanide elements. The perovskite materials of the present invention overcome the disadvantage of using relatively expensive, research-grade sources for the lanthanide elements. The advantage of the use of a mixed lanthanide source relates to the need for an inexpensive fabrication route. The cost of producing perovskites using the single phase mixed lanthanides of the present invention is three to four times less than the cost using a single rare-earth element.

Accordingly, the present invention provides a single phase perovskite-type catalyst consisting essentially of a metal oxide composition represented by the general formula, $A_{a-x}B_xMO_b$, in which A is a mixture of elements originally in the form of single phase mixed lanthanides collected from bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$. In a preferred embodiment, the single phase perovskite materials of the present invention have a formula $A_{1-x}B_xMO_3$, and preferably x is about 0 to 0.5. In another preferred embodiment, the single phase materials of the present invention are perovskite-type materials having a formula $A_{2-x}B_xMO_4$. In a further preferred embodiment, the single phase perovskite materials of the present invention have the general formula, $A_{a-x}B_xMO_b$, in which A is a mixture of elements selected from the group consisting of lanthanides of an atomic number of from 57 to 71, or alternatively, A is a mixture of elements selected from the group consisting of yttrium and lanthanides of an atomic number of from 57 to 71.

A single phase mixed lanthanide is a single compound wherein the cation positions in the compound's crystal structure can be occupied by a variety of lanthanides. Alternatively, the cation positions of the single phase mixed lanthanide may be occupied by a variety of lanthanides. For the purpose of the present invention, element A of the catalyst of the present invention is not a mixture of purified lanthanides. Instead, it is a mixture of elements originally in the form of single phase mixed lanthanides collected from bastnasite.

The single phase mixed lanthanides of the present invention are generated from bastnasite ore. They may contain a number of lanthanide cations and nitrate, carbonate, or chloride anions. These monophasic materials may be hydrated materials, namely, they may contain waters of hydration. Thus hydroxyl ions may take up anion positions in the lattice of the monophasic material.

It is known in the art that bastnasite is an ore of a mixed lanthanide fluoride carbonate. The mixed lanthanide fluoride carbonates of bastnasite adopt a crystal structure with discrete layers of [LnF] and [CO$_3$] (Y. Ni et al., *Am. Mineral.*, 78 (1993) 415), wherein F can be replaced by OH (M. Fleischer, *Can. Mineral*, 16 (1978) 361).

Different lanthanide (Ln) derivatives can be prepared from bastnasite through methods commonly known in the art. Examples of such methods are described in *Cer. Eng. Sc. Proc.* by B. T. Kilbourn, 6 (1985) pp. 1331–1341, and in *The Discovery and Industrialization of the Rare Earths*, by Fathi Habashi, UNOCAL 76 MOLYCORP (1994), FIG. 14, the text of which is incorporated herein by reference. A typical flow chart relating Ln derivatives obtained from bastnasite ores is shown in FIG. 1. According to FIG. 1, bastnasite ore is first treated by comminution and floatation to generate bastnasite concentrate. Through acid dissolution techniques, Ln carbonate, Ln chloride, or Ln nitrate is generated from the bastnasite concentrate. Through roasting and acid leaching techniques, soluble and insoluble fractions are generated from the bastnasite concentrate. La concentrate is from the soluble fraction, and Ce concentrate is from the insoluble fraction. Further solution extraction from the Ln concentrate produces low-Ce (i.e. 4% CeO$_2$ when analyzed on a Ln oxide basis) and mixed Ln compounds.

Ln derivatives can be classified in terms of steps needed to produce them. Both the bastnasite concentrate and the Ln derivatives generated by acid dissolution contain a natural ratio of Ln's. A natural ratio of Ln's is a ratio identical or close to their natural distribution proportions in bastnasite ores. A typical analysis on a Ln oxide basis is: 4.0% Pr oxide, 50.5% Ce oxide, 33.7% La oxide, and 11.8% Nd oxide. It is understood that this ratio may vary owing to inherent variability, not only in the ore body but also in the mineral itself. Both the La and Ce concentrates contain a modified ratio of Ln's. A modified ratio of Ln's is a ratio different from the natural ratio of Ln's, and a ratio existing in any by-products of the processing route of bastnasite is shown in FIG. 1.

The single phase mixed lanthanides used in the present invention may be generated from any of the above-mentioned concentrates. They may have a natural ratio of Ln's or a modified ratio of Ln's. In general, any single phase mixed lanthanides generated from any of the above-mentioned concentrates may be used as a lanthanide source for making a perovskite-type material of the present invention.

For example, Ln derivatives generated from bastnasite concentrate by acid dissolution, such as, but not limited to, Ln chloride, Ln carbonate, and Ln nitrate, are single phase, pure compounds with a mixture of Ln cations, and can be used as a Ln source for the purpose of the present invention. Such Ln derivatives have a natural ratio of Ln's, and are cerium-rich. Likewise, single phase mixed lanthanides, such as, but not limited to, hydrated mixed lanthanide carbonate or hydrated mixed lanthanide nitrate, may be crystallized as single phase compounds with a mixture of Ln cations coming out of a solution of La concentrate. Such single phase mixed lanthanides have a modified ratio of Ln's. For example, they may contain about 4% of CeO$_2$, when analyzed on a Ln oxide basis.

It should be appreciated that the single phase mixed lanthanides are not a mixture of purified lanthanides. The embodiments of the single phase mixed lanthanides are not purified by solvent extraction. As stated in the Kilbourn reference, cited earlier, individual purified lanthanides are prepared through liquid-liquid, counter-current, two-phase extraction procedures. A chain of 50 or more solvent extraction cells may be linked together to obtain pure lanthanides. The single phase mixed lanthanides of the present invention are not prepared and purified by solvent extractions that are required for lanthanide purification. Therefore, element A of the catalyst of the present invention is not a mixture of purified lanthanides, but rather a mixture of elements originally in the form of single phase mixed lanthanides collected from bastnasite as described herein. The perovskite-type materials of the present invention are doped on the A-site with sufficient and appropriate monovalent or divalent cations to form electrically conductive, monophasic perovskites with high catalytic activity. The examples of monovalent or divalent cations include, but are not limited to, Na, K, Li, Ca, Sr, Ba, Pb and the like. The amount of monovalent or divalent cations are sufficient and appropriate if they are in such an amount that the bulk composition's atomic ratio of element M in the B site and the A and B elements in the A site are about 1:1.

Similarly, a sufficient and appropriate M element is used for the B site of the perovskite or perovskite type materials of the present invention. M is one or more elements with atomic numbers lying in the range 22 to 30, 40 to 51, and 73 to 80. Examples of M element include, but are not limited to, Fe, Mn, Co, Ni, Ru, Cr, Pd, Cu, and the like. The amount of M elements is sufficient and appropriate if they are in such an amount that the bulk composition's atomic ratio of element M in the B site and the A and B elements in the A site are 1:1. In a preferred embodiment, the Mn element is in the B-site.

The present invention also provides a method of making the perovskite-type materials of the present invention. The method comprises the steps of making a homogeneous mixture of a single phase mixed lanthanide salts collected from bastnasite and respective salts, or oxides, of elements B and M, and forming the perovskite-type metal oxide composition from the homogeneous mixture.

The homogenous mixture of salts may be in a form of a solution or in a form of a solid. The homogenous mixture may be formed by dissolving a single phase lanthanide salt, together with salts containing elements B and M, respectively, in a solution such as water and also can be formed by dissolving in acid, e.g., vitric acid. The mixture may also be formed by grinding a single phase lanthanide salt with salts or oxides of element B and M. Other methods known in the art for forming the homogenous mixture may also be used. The salts used in the method of the present invention may be nitrates, carbonates, hydroxides, acetates, oxalates, or chlorides of component elements A, B, and M. Oxides of B and M may also be used to make the homogenous mixture. The amount of each salt used is a function of the desired composition in the final perovskite compound.

A perovskite-type metal oxide material may be formed from the mixture by techniques such as, but not limited to, pelletizing, spray-drying, sintering, or calcination. Those techniques may be used alone or in combination to obtain perovskite-type metal oxide materials.

In a preferred embodiment, a malic acid solution technique is used when the homogenous mixture is in a form of a solution. For example, the following salts may be dissolved in a solution such as water to form a homogenous mixture: a single phase lanthanide salt, such as, but not limited to, single phase mixed hydrated lanthanide carbonate, single phase mixed hydrated lanthanide nitrate or the like; a salt of elements B, such as, but not limited to, calcium nitrate tetrahydrate, strontium nitrate or the like; and one or more salts of element M, such as, but not limited to, cobalt nitrate hexahydrate, hydrated manganese nitrate, hydrated chromium nitrate, hydrated iron nitrate, hydrated palladium nitrate, nickel nitrate or the like. Then malic acid may be added and dissolved into the solution. A foam-like precipitate is formed through heating the solution to a temperature between 190 and 310° C. in air. The foam can be heated or calcined to a temperature of 400° C. or higher to form the perovskite-type material. In a preferred embodiment, the form is calcined in a temperature at a range of 500–1100° C. in air for about 1–25 hours. Periodic grinding during the calcining process is preferred. Alternatively, when an additional and different element M is desired, the salt or oxide form of such an element may be added to the precipitate and powdered or sintered together with the precipitate to form a powder of single phase perovskite-type metal oxide materials having multiple M elements.

In another preferred embodiment, a sintering or calcining technique is used when the homogenous mixture is in a form of a solid. For example, a single phase mixed lanthanide salt may be mixed with oxides of elements B and M by grinding and homogenizing to form a homogenous mixture. Then the mixture can be powdered or sintered at temperatures from 700 to 1000° C. to form a powder of single phase perovskite-type metal oxide materials.

The powders of perovskite-type materials can be further formed into pellets or beads. Techniques such as uniaxial cold press and the like may be used to form the pellets or beads.

The metal oxide materials made by the method of the present invention have the perovskite structure, and they are single phase materials. X-ray diffraction analysis is used to show the perovskite structure of materials, and the presence, if any, of second phases or impurity phases. The Brunauer, Emmett and Teller (B.E.T.) surface area is measured by a gas absorption apparatus for proving how fine-grained the powder is. The surface area is measured and is normalized to the weight of solid i.e., $m^2/g$. A high $m^2/g$ (specific surface area) corresponds to a small fundamental grain or particle size. Catalytic functions occur on surfaces; therefore, it is important that a catalyst can be made with a large specific surface area.

The perovskite-type material of the present invention may be in a bulk form or in the form of a dispersion, depending on the methods used to make it. A perovskite-type material is in a bulk form if it is the only material present in the system. On the other hand, a perovskite-type material is in the form of a dispersion if the system contains not only perovskite-type material, but also carrier materials. In this form, the perovskite-type material is made up of a large number of small perovskite particles existing on the surfaces of carrier materials (alumina, etc.).

A bulk perovskite-type material may be made by any method described above. The above-described methods may also be used to make a perovskite-type material in the form of a dispersion if the methods further include a step of mixing or impregnating a solution of the homogenous mixture with a carrier material. For example, in accordance with one embodiment of the present invention, a perovskite-type catalyst in the form of a dispersion may be made by the steps of: (a) forming a solution of a homogeneous mixture of single phase mixed lanthanide salts collected from bastnasite and respective salts or oxides of elements B and M, (b) mixing or impregnating the solution with a carrier material, and (c) calcining the impregnated carrier material under a condition that allows perovskite-type metal oxide composition to be formed on the carrier material.

For the purpose of the present invention, a carrier material may be a porous solid oxide that is, itself, not catalytically active. Carrier materials are used to provide a high surface area for the dispersed phase, and one that is stable at high temperatures and in a range of reducing and oxidizing conditions. In one embodiment of the present invention, carrier material is used in a powder form. Examples of a carrier material include, but are not limited to, inert powder such as gamma-alumina, any ceria-based powders (imparting oxygen storage capacity), or any mixture of titania, silica, alumina (transition and alpha-phase), ceria, zirconia, $Ce_{1-x}Zr_xO_2$, and all the possible doped ceria formulations.

The single phase perovskite-type metal oxide materials of the present invention can be used as a catalyst. The perovskite-type catalyst of the present invention may be used as is, or after being deposited on carriers of various types and forms. They may take the form of pellets and particles which may be of uniform composition. They may take a supported form with the active ingredient being dispersed through or present as a coating on the individual bodies.

For example, the perovskite-type material of the present invention can be extruded or molded into monolithic bodies, including honeycombs that consist of channels running the length of the body with thin interconnected walls. The methods of making such extrusions are well known in the art. Briefly, in making the extrusions, organic compounds and liquids are added to the perovskite-type powders such that a plastic mass of appropriate rheological properties is formed. This body is extruded through an appropriately designed die to form a green body and is then heat-treated or calcined at temperatures to impart a sufficient mechanical strength and durability and to completely remove all organic additions.

The perovskite-type powder of the present invention also may be formed into an open cell foam according to methods known in the art. Briefly, the ceramic powder which is to be formed into a foam is mixed with carbon powder. The mixture is heated to high temperature in a sufficiently oxygen-containing atmosphere such that the carbon support is removed, leaving a solid ceramic foam with open, interconnected cells.

In addition, the perovskite-type powder of the present invention may be deposited or applied to the surface of a ceramic honeycomb or some other monolith. The ceramic honeycomb may be a type of alumina, mullite, cordierite or some other alumino-silicate support. The application can occur via a washcoat, as known in the art. Alternatively, the perovskite-type materials of the present invention may also be deposited or applied to the surface of a metal honeycomb support. Preferably, all the supports, either metallic or ceramic, offer a three-dimensional support structure.

Furthermore, the perovskite-type powder of the present invention may be dispersed on the ceramic or metallic support by impregnating the support with the same solution used to make the perovskite-type powder in accordance with the present invention. Preferably, the support is pre-coated with carrier powders. The impregnated support is heated to a high enough temperature to allow the perovskite-type phase to form on the surface of the carrier powders of the support in a highly dispersed state.

One aspect of the present invention also provides a catalytic converter and a method of making a catalytic converter. For the purpose of the present invention, the term "catalytic converter" refers to a solid structure having catalytic activity. The solid structure may be enclosed in a housing, i.e., a metal can. In general, the catalytic converter comprises a structural support and a catalyst that coats the support. A catalytic converter contains the appropriate type and amount of catalyst so that it can fulfill a precise catalytic function. For example, it may perform a conversion function. The conversion can be of gases into other gaseous products, liquids into other liquids, liquids into gaseous products, solids into liquids, solids into gaseous products, or any combination of these specific conversions. In all cases, the conversion reaction or reactions are deliberate and well-defined in the context of a particular application, i.e., simultaneous conversion of $NO_x$, HC and CO, conversion of MTBE to carbon dioxide plus steam, etc.

In accordance with one embodiment of the present invention, a catalytic converter of the present invention includes a perovskite-type catalyst of the present invention and a structure for supporting the catalyst. In one embodiment of the present invention, a catalytic converter may also contain a carrier material. The perovskite-type catalyst contained in the converter may be in a bulk form or in the form of a dispersion. The converter may also contain one or more different catalysts which are in the same form or different forms.

The converter may contain one carrier material or a mixture of different carrier materials. Preferably, the carrier materials are in a powder form. The carrier material may be an inert powder or any other carrier materials that are known in the art for forming a washcoat on a support. The term "washcoat" as used herein refers to a coating of oxide solids that is formed onto a solid support structure. For the purpose of the present invention, the oxide solids may be carrier oxides or one or more catalyst oxides or mixture of carrier oxides and catalyst oxides (i.e., perovskite-type materials). A washcoat may be formed by forming a slurry of the oxide solids and depositing, i.e., washing, the slurry onto the support structure. Other methods that are known in the art for forming a washcoat on a support are also included in the present invention. Examples of a carrier material include, but are not limited to, inert powders such as gamma-alumina, any ceria-based powders (imparting oxygen storage capacity), or any mixture of titania, silica, alumina (transition and alpha-phase), ceria, zirconia, $Ce_{1-x}Zr_xO_2$, and all the possible doped ceria formulations.

For the purpose of the present invention, a structure for supporting a catalyst of the present invention may be any support structures known in the art. In one embodiment of the present invention, the structure is a honeycomb support. The honeycomb support may be a ceramic honeycomb support or a metal honeycomb support. In a different embodiment, the support structure may be in a form of beads or pellets.

In accordance with another embodiment of the present invention, a catalytic converter of the present invention may also contain a non-perovskite type catalyst, in addition to the perovskite-type catalyst, for achieving different conversion results. For example, the non-perovskite-type catalyst may be a base metal, a noble metal or a mixture thereof. Examples of a base metal catalyst include, but are not limited to, metallic elements with atomic numbers 3–4, 11–15, 19–32, 37–43, 48–52, 56–75, 80–83. Examples of a noble metal catalyst include, but are not limited to, elements with atomic numbers 44, 45, 46, 47, 76, 77, 78 and 79.

Different methods may be used to make the catalytic converters of the present invention. For example, in one embodiment, perovskite-type catalysts of the present invention in bulk form may be suspended to form a stable suspension and deposited to a solid support structure by methods known in the art. Alternatively, the bulk catalyst may be mixed with a carrier powder or pre-mixed carrier powders, i.e., inert powders such as gamma-alumina, any ceria-based powders or a mixture thereof, to form a stable slurry suspension. The slurry suspension is then deposited to a solid support by a slurry deposition technique that is known in the art.

In accordance with another embodiment of the present invention, a catalytic converter of the present invention is made by depositing the perovskite-type catalyst of the present invention in the form of a dispersion onto a solid support. According to this embodiment, a solution of a homogenous mixture of salts of element A and respective salts or oxides of elements B and M may be mixed and impregnated into a number of carrier powders including, but not limited to, titania, silica, alumina (transition and alpha-phase), ceria, zirconia, $Ce_{1-x}Zr_xO_2$ and all the possible doped ceria formulations. These impregnated powders are dried and calcined at elevated temperatures to form perovskite-type catalysts in the form of a dispersion. The formed catalysts may be then slurry deposited individually, in combinations, or sequentially onto commercially available support structures. Alternatively, the carrier powders may be pre-mixed, and the solutions of the homogenous mixtures are impregnated into pre-mixed carrier powders, such as ceria-alumina mixtures. For the purpose of the present invention, a solution of a homogenous mixture contains elements A, B and M in a ratio that is given by the formula $A_{1-x}B_xM$, wherein x is a number defined by $0 \leq x < 0.5$.

In another embodiment of the present invention, one or more carrier powders may be first slurry deposited to a solid support to form a washcoat according to methods known in the art. Then, solutions of the homogenous mixtures of the present invention are impregnated into the pre-formed washcoat(s). After the catalyst impregnation, the support body is calcined in air at high temperature to form the desired phase chemistry. Examples of carrier powders that may be used to form a washcoat include, but are not limited to, titania, silica, alumina (transition and alpha-phase), ceria, zirconia, $Ce_{1-x}Zr_xO_2$, and all the possible doped ceria formulations.

In accordance with one embodiment of the present invention, the washcoat may contain not only carrier powders, but also perovskite-type catalysts of the present invention. For example, bulk perovskite-type catalysts of the present invention may be mixed with carrier powders to be slurry deposited to a solid support to form a washcoat. Then, solutions of the homogenous mixtures may be impregnated into the washcoat and calcined to form perovskite-type metal oxides on the washcoat. In this embodiment, the washcoat may contain the bulk perovskite-type catalyst of the present invention and may also contain, optionally, ceria-based oxygen storage material and high-surface area gamma-alumina.

It is the discovery of the present invention that, not only the solutions of the perovskite-type materials of the present invention may be deposited into a washcoat containing a perovskite-type material, other non-perovskite-type catalysts may also be deposited to such a washcoat to achieve unexpected catalytic results. Accordingly, a catalytic converter of the present invention may also be formed by depositing a non-perovskite-type catalyst into a washcoat of a support which contains a perovskite-type material. In one embodiment of the present invention, the non-perovskite-type catalyst may be a base, or a noble metal, or a mixture thereof. Examples of a base metal catalyst include, but are not limited to, metallic elements with atomic numbers 3–4, 11–15, 19–32, 37–43, 48–52, 56–75, 80–83. Examples of noble metal catalysts include, but are not limited to, elements with atomic numbers 44, 45, 46, 47, 76, 77, 78 and 79.

The perovskite-type catalyst of the present invention has an improved three-way catalytic activity for the removal of unsaturated and saturated hydrocarbons, nitrogen oxides and carbon monoxide from the exhaust gases of internal combustion engines, including small gasoline engines, and from industrial waste gases. They also exhibit high thermal and chemical stability. Further they possess resistance to sulfur dioxide poisoning.

Accordingly, the perovskite-type catalysts of the present invention have a wide range of applications. For example, the perovskite-type catalysts of the present invention may be used for clean-up of exhaust emissions from all kinds of internal combustion engines. They may also be used in industrial catalysis for the production of industrial chemicals, fertilizers, and products in the polymer and plastics field. They may further be used in all oil-derived processes and products. They may also be used for clean-up of industrial process emissions including, but not limited to, volatile hydrocarbons, chlorinated hydrocarbons and MTBE.

In particular, the catalysts of the present invention may be used, for example, in the control of gaseous and particulate emissions from all types of Otto cycle and Diesel cycle internal combustion engines (including Otto cycle lean-burn engines, Otto cycle and diesel cycle engines equipped with SCR capability with ammonia or hydrocarbon intake); olefin polymerization, hydrogenation reactions, methanol synthesis from syngas (either carbon monoxide and hydrogen mixtures or mixtures also containing carbon dioxide); hydroformylation of alkenes; Fischer-Tropsch Synthesis; isomerization of hydrocarbons; aromization reactions; catalytic cracking reactions; reactions involving the removal of Sulfur and/or Nitrogen and/or Oxygen from oil-derived hydrocarbons by hydrogenation; steam reforming of methanol and other hydrocarbons and hydrocarbon mixtures (e.g., gasoline) to produce gas mixtures containing hydrogen; the latter reactions where the hydrogen gas is used in a fuel-cell; epoxidation of alkenes; partial and/or selective oxidation of hydrocarbons; oxidation of volatile organic compounds (VOCs), including MTBE.

It is known in the art that perovskite materials (powders, single crystals and thin films) containing Mn on the B-site show the giant magnetoresistance effect. Because of this, the perovskite materials of the present invention having Mn on the B-site may also be used to make devices such as magnetic recording heads or the like.

The following examples are intended to illustrate, but not to limit, the scope of the invention. While the method described provides the necessary information to make any given perovskite materials of the present invention typically those that might be used, other procedures known to those skilled in the art may alternatively be used.

Methods of Making Perovskite or Perovskite-Type Materials of the Present Invention

EXAMPLE 1

A single phase perovskite material of the nominal chemical composition $Ln_{0.6}Ca_{0.4}CoO_3$ was synthesized by dissolving 104.15 g of mixed hydrated lanthanide carbonate, $Ln_2(CO_3)_3 \cdot 4H_2O$, in a solution formed by dissolving 57.5 g of calcium nitrate tetrahydrate, $Ca(NO_3)_2 \cdot 4H_2O$ and 177.15 g of cobalt nitrate hexahydrate, $Co(NO_3)_3 \cdot 6H_2O$, into 2 liters of water. Intense stirring was used to form a solution of all the components. The mixed lanthanide carbonate hydrate contains La, Ce, Pr and Nd. To this solution was added 200 g of malic acid. The solution was placed in a rotary evaporator and heated by a water bath. The water bath was heated to 90° C. The solution was reduced to 20% of its original volume, and had the consistency of a thick syrup. The syrup was placed into a flat refractory tray and heat treated at 200° C. for 1 hr. The syrup was converted into a solid foam. The foam was then heat treated at a temperature of 700° C. in air for 2 hrs. with an intermediate grind after 1 hr. The product comprised a black powder of the noted chemical composition. X-ray diffraction analysis showed the material to be a single phase perovskite with a B.E.T. specific surface area of 13 m$^2$/g.

The mixed hydrated lanthanide carbonate used herein is a single phase compound crystallized from the La concentrate generated from the bastnasite ore. Therefore, it contained a modified ratio of Ln's. The cerium concentration is about 4% on a lanthanide oxide basis.

Figure 2:
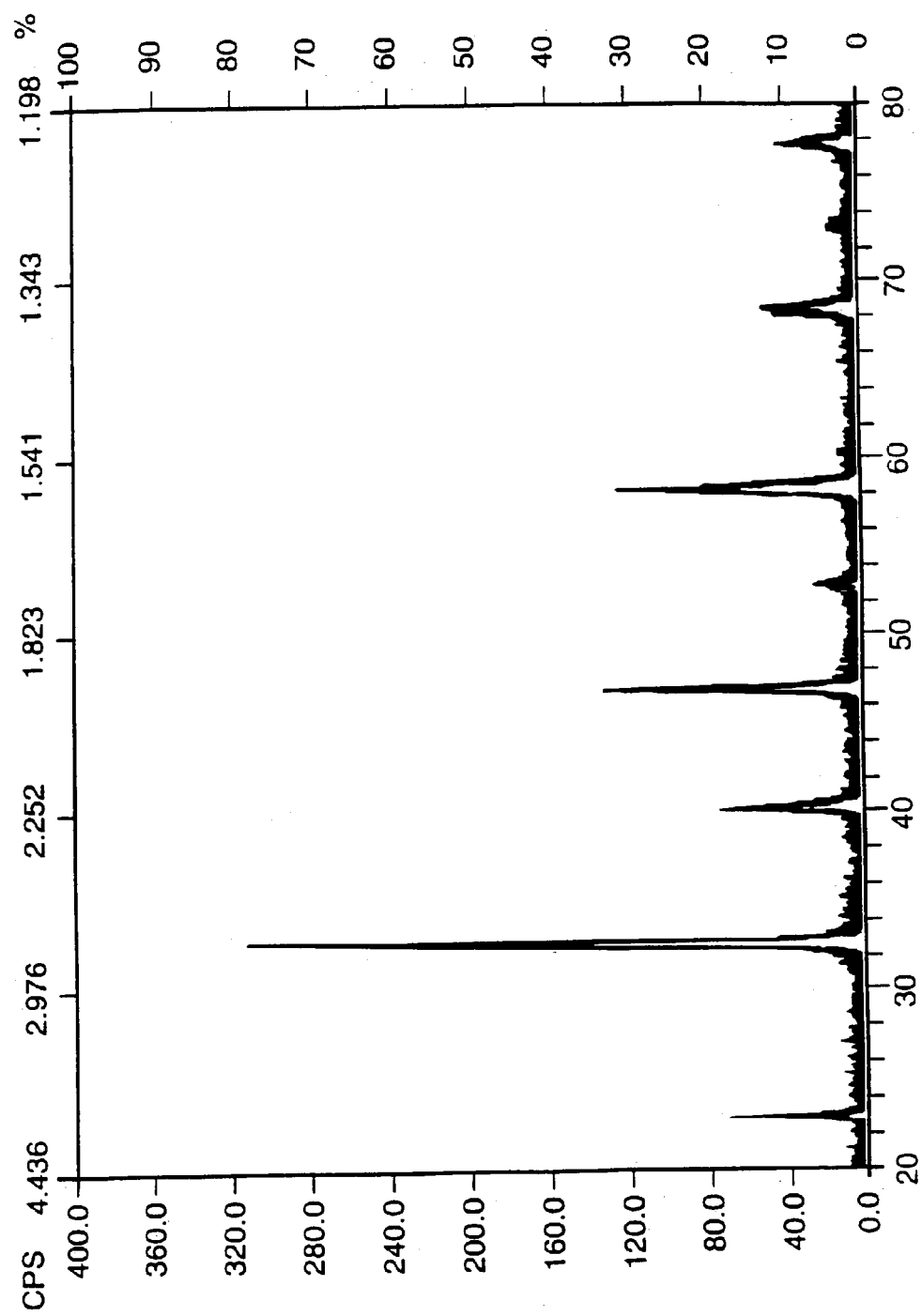
FIG. 2 shows the X-ray diffraction trace of a perovskite material of the present invention.

FIG. 2 shows the measured X-ray diffraction intensity as a function of two-theta when a perovskite material of composition $Ln_{0.6}Ca_{0.4}CoO_3$, made according to Example 1, is impinged by a source of monochromatic X-ray radiation. FIG. 2 shows that the compound of Example 1 is a single phase perovskite material. All the peaks in the trace can be indexed according to the crystal structure of the perovskite phase.

EXAMPLE 2

A single phase perovskite material of the same chemical composition as in Example 1 was synthesized by dissolving 104.15 g of mixed hydrated lanthanide carbonate, $Ln_2(CO_3)_3.4H_2O$, in a solution formed by dissolving 57.5 g of calcium nitrate tetrahydrate, $Ca(NO_3)_2.4H_2O$ and 177.15 g of cobalt nitrate hexahydrate, $Co(NO_3)_3.6H_2O$, into 2 liters of water. Intense stirring was used to form a solution of all the components. To this solution was added 200 g of malic acid. The solution was reduced to half its volume by heating at 80° C. on a hot plate for 3 hrs. The solution was then placed on a refractory tray and heated at 200° C. for 1 hr. The solid foam so obtained was heat treated at 700° C. in air for 2 hrs. with an intermediate grind after 1 hr. The product comprised a black powder of the noted chemical composition and X-ray diffraction analysis showed the material to be a single phase perovskite with a B.E.T. specific surface area of 13 m$^2$/g.

EXAMPLE 3

A single phase perovskite material of the same composition as in Examples 1 and 2 was synthesized by grinding and homogenizing 52.08 g of mixed hydrated lanthanide carbonate, 6.83 g of calcium oxide, CaO and 22.82 g of cobalt oxide, CoO. The mixture was heated at 800° C. for 36 hrs. in air with periodic regrinding. The product, comprising a black powder, was characterized by X-ray diffraction as being a single phase perovskite compound with a B.E.T. surface area of 1.2 m$^2$/g.

EXAMPLE 4

A single phase perovskite powder, as produced according to Example 1, was consolidated into pellets by using a uniaxial cold press. The pellets so produced were heat-treated at a range of heat treatment temperatures for a period of 1 hr. The pellets so heat-treated were analyzed by X-ray diffraction and the B.E.T. specific surface area was measured. In each case X-ray diffraction showed that the material remained a single-phase perovskite material regardless of heat treatment temperature.

EXAMPLE 5

A single phase perovskite powder of composition $Ln_{0.83}Sr_{0.17}MnO_3$ was synthesized according to the method illustrated in Example 2. The powder was made by dissolving 105.3 g of mixed hydrated lanthanide carbonate, $Ln_2(CO_3)_3.4H_2O$, 10.1 g of strontium nitrate $Sr(NO_3)_2$ and 50 g of hydrated manganese nitrate, $Mn(NO_3)_2.6H_2O$ into 2 liters of water. Malic acid was added to the solution and heat treatments were carried out as in Example 2. The product comprised a black powder of the noted chemical composition and X-ray diffraction analysis showed the material to be a single phase perovskite with a B.E.T surface area of 9.3 m$^2$/g.

EXAMPLE 6

A single-phase perovskite powder of composition $Ln_{0.7}Sr_{0.3}CrO_3$ was synthesized according to the method illustrated in Example 2. A solution was made by dissolving 23.48 g of mixed hydrated lanthanide carbonate, $Ln_2(CO_3)_3.4H_2O$, 7.52 g of strontium nitrate, $Sr(NO_3)_2$, and 45 g of hydrated chromium nitrate, $Cr(NO_3)_3.9H_2O$ into 1 liter of water. 60 g of malic acid was added to the solution. Heat treatments were carried out as in Example 2. A heat treatment temperature of 900° C. was required to obtain a phase-pure, perovskite material. The product was an olive green powder with a B.E.T. surface area of 11.3 m$^2$/g.

EXAMPLE 7

A single-phase perovskite powder of composition $Ln_{0.6}Ca_{0.4}Fe_{0.8}Mn_{0.2}O_3$ was synthesized according to the method illustrated in Example 2. A solution was formed by dissolving 47.68 g of mixed hydrated lanthanide carbonate, $Ln_2(CO_3)_3.4H_2O$, 26.50 g hydrated calcium nitrate, $Ca(NO_3)_2.4H_2O$, 90.7 g of hydrated iron nitrate, $Fe(NO_3)_3.9H_2O$, and 17.93 g of hydrated manganese nitrate, $Mn(NO_3)_2.6H_2O$ into 2 liters of water. To this solution was added 130 g of malic acid. Heat treatments were carried out as in Example 2. The product was a black, single-phase perovskite powder of the noted chemical composition, having a B.E.T. surface area of 32.1 m$^2$/g.

EXAMPLE 8

A single phase perovskite material of composition $Ln_{0.8}Sr_{0.2}Mn_{0.9}Ni_{0.04}Ru_{0.06}O_3$ was synthesized. A solution was formed using 45.78 g of mixed hydrated lanthanide carbonate, $Ln_2(CO_3)_3.4H_2O$, 52.18 g of manganese nitrate hexahydrate, $Mn(NO_3)_2.6H_2O$, 8.56 g of strontium nitrate, $Sr(NO_3)_2$ and 2.35 g of nickel nitrate hexahydrate, $Ni(NO_3)_2.6H_2O$ in 1 liter of water. To the solution was added 60 g of malic acid. This solution was reduced to half the original volume by heating on a hot plate for 3 hrs. The solution was converted into a solid foam as in Example 2. The solid foam so obtained was heated at 350° C. for 2 hrs. and ground with 1.61 g of ruthenium oxide, $RuO_2$. This mixture was then heat treated at 800° C. for 10 hrs. to produce a single-phase perovskite powder of the desired composition with a B.E.T. surface area of 9.8 m$^2$/g.

EXAMPLE 9

A single-phase perovskite powder of composition $Ln_{0.8}K_{0.2}Mn_{0.95}Ru_{0.05}O_3$ was synthesized according to the method illustrated in Example 8. A solution was formed by dissolving 52.17 g of mixed hydrated lanthanide carbonate, $Ln_2(CO_3)_3.4H_2O$, 4.66 g of potassium nitrate, $KNO_3$, and 62.77 g of hydrated manganese nitrate, $Mn(NO_3)_2.6H_2O$ in 2 liters of water. 110 g of malic acid was dissolved in this solution. As illustrated in Example 8, $RuO_2$ was added to the foamed solution after a heat treatment at 350° C. In this example, 1.53 g of $RuO_2$ was added to the ground, heat treated foam. This mixture was heat treated at 700° C. for 15 hrs. to produce a black, single-phase perovskite powder of the noted composition and with a specific, B.E.T. surface area of 10.5 $m^2/g$.

EXAMPLE 10

A single-phase perovskite powder of composition $Ln_{0.7}Sr_{0.3}Cr_{0.95}Ru_{0.05}O_3$ was synthesized according to the method illustrated in Example 8. A solution was formed by dissolving 39.27 g of mixed hydrated lanthanide carbonate, $Ln_2(CO_3)_3.4H_2O$, 12.57 g of strontium nitrate, $Sr(NO_3)_2$, and 75.27 g of hydrated chromium nitrate, $Cr(NO_3)_3.9H_2O$, in 1.5 liters of water. To this solution, 82 g of malic acid was added. 1.32 g of $RuO_2$ was added to a powder comprising the foamed solution that had been heat treated at 350° C. This mixture was then heat treated at 1000° C. for 32 hrs. to produce a dark brown single-phase perovskite powder of the noted composition. The B.E.T. surface area of the powder was 12.9 $m^2/g$.

EXAMPLE 11

A single-phase perovskite of composition $LnNiO_3$ was synthesized according to the method illustrated in Example 2. A solution was formed by dissolving 38.97 g of mixed hydrated lanthanide concentrate, $Ln_2(CO_3)_3.4H_2O$ and 40 g of hydrated nickel nitrate, $Ni(NO_3)_2.6H_2O$ to 0.5 liters of water. Into this solution was dissolved 50 g of malic acid. Heat treatments were carried out as in Example 2. The black powder so obtained was a single-phase perovskite of the noted composition, with a specific surface area of 23.2 $m^2/g$.

EXAMPLE 12

A single-phase powder with the perovskite-type "$K_2NiF_4$" structure of composition $Ln_2(Cu_{0.6}Co_{0.2}Ni_{0.2})O_4$ was synthesized according to the method illustrated in Example 2. A solution was formed by dissolving 50.0 g of mixed hydrated lanthanide concentrate, $Ln_2(CO_3)_3.4H_2O$, 12.32 g of hydrated copper nitrate, $Cu(NO_3)_2.6H_2O$, 5.13 g of hydrated nickel nitrate, $Ni(NO_3)_2.6H_2O$ and 5.14 g of hydrated cobalt nitrate, $Co(NO_3)_3.6H_2O$, in 2 liters of water. Into this solution was dissolved 150 g of malic acid. Heat treatments were carried out as in Example 2. The black powder so obtained was a single-phase powder with the "$K_2NiF_4$" structure of the noted composition and with a specific surface area of 14.3 $m^2/g$.

EXAMPLE 13

A single phase perovskite material of composition $Ln_{0.8}K_{0.2}Mn_{0.95}Ru_{0.05}O_3$ was synthesized according to the method illustrated in Example 9. A solution was formed by dissolving 50.3 g of a mixed hydrated lanthanide nitrate, $Ln(NO_3)_3.4H_2O$, 39.56 g of hydrated manganese nitrate, $Mn(NO_3)_2.6H_2O$, and 2.94 g of potassium nitrate, $KNO_3$, in 1.5 liters of water. 51 g of citric acid was dissolved in this solution. As illustrated in Example 9, $RuO_2$ was added to the foamed solution after a heat treatment at 350° C. In this example, 0.96 g of $RuO_2$ was added to the ground, heat-treated foam. This mixture was heat treated at 700° C. for 15 hrs. to produce a black, single-phase perovskite powder of the noted composition with a B.E.T. surface area of 12.2 $m^2/g$.

The hydrated lanthanide nitrate is a single phase product of crystallization coming out of the solution of La concentrate generated from the bastnasite ore. The product has a modified ratio of Ln's. The cerium concentration on an oxide base is about 5% of the total Ln's.

EXAMPLE 14

A single phase perovskite material of composition $Ln_{0.6}Ca_{0.4}Fe_{0.8}Mn_{0.2}O_3$ was synthesized according to the method illustrated in Example 2. A solution is formed by dissolving 71.64 g of Ln carbonate, $Ln_2(CO_3)_3.4H_2O$, 39.75 g hydrated calcium nitrate, $Ca(NO_3)_2.4H_2O$, 136.05 g of hydrated iron nitrate, $Fe(NO_3)_3.9H_2O$ and 26.90 g of hydrated manganese nitrate, $Mn(NO_3)_2.6H_2O$ into 3 liters of water. To this solution was added 130 g of malic acid. Heat treatments were carried out as in Example 2. The product was a black, single-phase perovskite powder of the noted chemical composition, having a B.E.T. surface area of 34.3 $m^2/g$. The mixed hydrated Ln carbonate used in this example is a single phase compound prepared from bastnasite concentrate through an acid dissolution process. It has a natural ratio of Ln's. Therefore, the cerium concentration reflects the natural ratio of cerium in any given bastnasite, i.e., it is slightly higher than the La content on a LnO basis.

EXAMPLE 15

A single-phase perovskite material $Ln_{0.8}Sr_{0.2}Mn_{0.9}Ni_{0.04}Pd_{0.06}O_3$ was synthesized by dissolving 50.0 g of mixed hydrated lanthanide carbonate, $Ln_2(CO_3)_3.4H_2O$, in a solution formed by dissolving 60.57 g of hydrated manganese nitrate, $Mn(NO_3)_2.6H_2O$, 9.92 g strontium nitrate, $Sr(NO_3)$, 3.67 g hydrated palladium nitrate, $Pd(NO_3).xH_2O$ (where x is about 1.7) and 2.73 g nickel nitrate, $Ni(NO_3).6H_2O$ and 1 liter of water. The mixed Ln compound contains La, Ce, Pr and Nd and is derived from bastnasite. To the solution that was formed, 194.0 g of malic acid was added and dissolved. This solution was dried at 190–310° C. for 1 hr. and heat-treated in a temperature range 500–1100° C. in air for 1–25 hrs. The product from any of these heat treatments was found to be a single-phase perovskite powder. The surface area varied depending on the precise heat treatment. The B.E.T. specific surface area was 8.2 $m^2/g$ if the heat treatment was 1000° C. for 16 hrs.

EXAMPLE 16

A single-phase perovskite material $Ln_{0.8}Sr_{0.2}Mn_{0.9}Ni_{0.04}Pt_{0.06}O_3$ was synthesized according to the method described in Example 15. The product was found to be a single-phase perovskite powder. The surface area varied depending on the precise heat treatment. The B.E.T. specific surface area was 9.4 $m^2/g$ if the heat treatment was 1000° C. for 16 hrs.

This composition was tested for its three-way catalytic conversion activity in a gas that closely simulates automobile exhaust. The catalyst was found to have reasonable three-way conversion activity over a range of redox potentials.

EXAMPLE 17

A single-phase perovskite material $Ln_{0.8}Sr_{0.2}Mn_{0.9}Ni_{0.04}Ru_{0.06}O_3$ was synthesized according to the method described in Example 15. Appropriate quantities of the salt ruthenium nitrosyl nitrate were used as the soluble ruthenium source. The product was found to be a single-phase perovskite powder. The surface area varied depending on the precise heat treatment. The B.E.T. specific surface area was 3.2 m$^2$/g if the heat treatment was 1100° C. for 16 hrs.

EXAMPLE 18

A single-phase perovskite material $Ln_{0.07}Sr_{0.3}Mn_{0.9}Ni_{0.04}Ru_{0.06}O_3$ (Ln=low-Ce mixture of La, Ce, Pr and Nd) was synthesized by the method described in Example 15. The product from heat treatments in air was found to be a single-phase perovskite powder. The surface area varied depending on the precise heat treatment.

This composition was tested for its three-way catalytic conversion activity in a gas that closely simulates automobile exhaust. The catalyst was found to have good three-way conversion activity over a range of redox potentials. The hydrocarbon and CO conversions in reducing gases were found to be superior to that of the material described in Example 15. It is clear that the catalyst is an efficient three-way converter over a wide redox window, and thus, it is very suitable for use in a three-way catalytic converter for the conversion of toxic emissions in combustion engine exhausts.

EXAMPLE 19

A single-phase perovskite material $LnMn_{0.5}Cu_{0.5}O_3$ was synthesized according to the method described in Example 15. The product was found to be a single-phase perovskite powder. The surface area varied depending on the precise heat treatment. The B.E.T. specific surface area was 7.4 m$^2$/g if the heat treatment was 1000° C. for 16 hrs.

This composition was tested for its three-way catalytic conversion activity in a gas that closely simulates automobile exhaust. The catalyst was found to have reasonable three-way conversion activity over a range of redox potentials.

EXAMPLE 20

A single-phase perovskite material $LnMn_{0.8}Ni_{0.10}Cu_{0.10}O_3$ was synthesized according to the method described in Example 15. The product was found to be a single phase perovskite powder. The surface area varied depending on the precise heat treatment. The B.E.T. specific surface area was 10.1 m$^2$/g if the heat treatment was 1000° C. for 16 hrs.

This composition was tested for its three-way catalytic conversion activity in a gas that closely simulates automobile exhaust. The catalyst was found to have reasonable three-way conversion activity over a range of redox potentials.

EXAMPLE 21

In this example, a single-phase perovskite material was made into powder and deposited onto a commercially available support structure. A single-phase perovskite material $Ln_{0.8}Sr_{0.2}Mn_{0.9}Ni_{0.04}Pd_{0.06}O_3$ was synthesized by dissolving 100 g of mixed hydrated lanthanide carbonate and 400 g of malic acid in a solution formed by dissolving 121.14 g of hydrated manganese nitrate, 19.84 g of strontium nitrate, 29.76 g of 10.0 wt % Pd nitrosyl nitrate solution and 5.46 g of nickel nitrate hexahydrate and 2 liters of water. The solution was dried and heat-treated at 800° C. for 16 hrs. in air. The single-phase powder was then formed into a slurry with water and 5% Dispural, and coated onto a 400 cells-per-square-inch cordierite honeycomb. After drying, the coated honeycomb was heat-treated at 700° C. for 2 hrs. The loading of perovskite was in the range 5–25 g per liter of geometric volume of substrate. The three-way performance at stoichiometric air-fuel ratios at 400° C. is given by 83.4% $NO_x$, 92.1% CO and 85.2% THC.

EXAMPLE 22

In this example, a single-phase perovskite material in powder form was mixed with a carrier powder. A single-phase perovskite material $Ln_{0.8}Sr_{0.2}Mn_{0.9}Ni_{0.04}Pd_{0.06}O_3$ was synthesized by dissolving 100 g of mixed hydrated lanthanide carbonate and 400 g of malic acid in a solution formed by dissolving 121.14 g of hydrated manganese nitrate, 19.84 g of strontium nitrate, 29.76 g of 10.0 wt % Pd nitrosyl nitrate solution and 5.46 g of nickel nitrate hexahydrate and 2 liters of water. The solution was dried and heat-treated at 800° C. for 16 hrs. in air. The single-phase powder was then formed into a slurry by methods well known in the art, being mixed and milled with water, gamma-alumina, ceria-zirconia ($Ce_{1-x}Zr_xO_2$) and Dispural, and coated onto a 300 cells-per-square-inch metal honeycomb substrate. The ratio of the four solid ingredients in the slurry is being given by: perovskite/alumina/ceria-zirconia/dispural=8/70/20/2 wt %. After drying, the coated honeycomb was heat-treated at 700° C. for 2 hrs. The loading of solids per liter of honeycomb was in the range 70–200 g. The three-way performance in perturbed exhaust gas streams, space velocity 80,000 hr$^{-1}$, with stoichiometric average air-fuel ratios at 400° C. after high temperature aging is given by 87.4% $NO_x$, 95.1% CO and 88.2% THC.

EXAMPLE 23

In this example, a carrier powder was used to support an efficient low-cost catalyst. A solution with the cation composition $Ln_{0.7}Sr_{0.3}Mn_{0.9}Pd_{0.1}$ was synthesized according to the previous example. This solution was then impregnated into a gamma-alumina powder previously treated with bastnasite-derived mixed lanthanide nitrate solution and so having the formula $Ln_{0.1}Al_{0.9}O_3$. The powder at incipient wetness was then dried at 85° C. for 5 hrs. and heated at 200° C. for 5 hrs. and then finally at 900° C. for 16 hrs. The mixed powder contained 6 wt % perovskite and possessed a high specific surface area even when heat-treated at 1100° C. for 20 hrs. The powder was then loaded onto a cordierite honeycomb structure by first forming it into a slurry with 4% Dispural and water and acetic acid. The coated honeycombs were loaded to 120 g/L with the composite powder.

The temperature known as the light-off temperature—the temperature above which the catalyst is functioning—was measured for $NO_x$, CO and hydrocarbons as 315° C., 225° C. and 234° C., respectively, for a 100,000 hr$^{-1}$ space velocity.

EXAMPLE 24

In this example, pre-formed washcoats containing one or more of the carrier powders were used to support an efficient low-cost catalyst. A washcoat was formed onto a cordierite honeycomb support with 600 cells-per-square-inch consisting of ceria-zirconia (25 wt % zirconia) and gamma alumina in the weight ratio of 1:5. The washcoat loading was in the range 50–250 g per liter. A solution with the cation composition $Ln_{0.5}Sr_{0.5}Mn_{0.9}Pd_{0.1}$ (containing 100 g malic acid per liter of solution) was impregnated into the washcoated honeycombs and the channels blown clear of excess. The parts were dried and heat-treated at temperatures in the range of 500–1000° C. The perovskite catalyst loading was in the 2–12 g/L range in the final part.

The catalysts were aged according to a 4-mode accelerated aging cycle simulating 100,000 miles of driving a car. The emissions from the tailpipe of a 4-cylinder gasoline powered automobile were 0.06 g/mile hydrocarbons, 1.3 g/mile CO and 0.12 g/mile $NO_x$. These emissions correspond to reductions compared to those from the tailpipe of 95% HC, 83% CO and 96% $NO_x$ over the Federal Test Procedure drive cycle.

EXAMPLE 25

In this example, a pre-formed washcoat containing fully formed perovskite phases of the present invention was used to support an efficient low-cost catalyst. A washcoat was formed onto a cordierite honeycomb support with 400 cells-per-square-inch consisting of ceria-zirconia (25 wt % zirconia) and gamma alumina in the weight ratio of 1:5 but also containing 10 wt % perovskite of formula $Ln_{0.8}Sr_{0.2}MnO_3$. The washcoat loading was in the range 50–150 g per liter. A solution with the cation composition $Ln_{0.5}Sr_{0.5}Mn_{0.98}Pd_{0.02}$ (containing 100 g malic acid per liter of solution) was impregnated into the washcoated honeycombs and the channels blown clear of excess. The parts were dried and heat-treated at temperatures in the range of 600–900° C. The perovskite catalyst $Ln_{0.5}Sr_{0.5}Mn_{0.98}Pd_{0.02}O_3$ was loaded in the 5–20 g/L range in the final part.

The catalysts were aged according to a 2-mode accelerated aging cycle simulating 50,000 miles of driving a car and then tested on a bench reactor with simulated car exhaust. The transient conversion efficiencies of $NO_x$, CO and HC, at 400° C. and 100,000 $hr^{-1}$ space velocity, were measured as 78%, 88% and 93%, respectively.

EXAMPLE 26

In this example, a pre-formed washcoat was used as a carrier. A washcoat was formed onto a cordierite honeycomb support with 400 cells-per-square-inch consisting of ceria-zirconia and perovskite of formula $Ln_{0.8}Sr_{0.2}MnO_3$ in equal weight proportions. The washcoat loading was in the range 50–100 g per liter. A solution with the cation composition $Ln_{0.8}Sr_{0.2}Mn_{0.96}Pd_{0.04}$ (containing 100 g malic acid per liter of solution) was impregnated into the washcoated honeycombs and the channels blown clear of excess. The parts were dried and heat-treated at temperatures in the range of 600–900° C. The perovskite catalyst $Ln_{0.8}Sr_{0.2}Mn_{0.96}Pd_{0.04}O_3$ was loaded in the 5–10 g/L range in the final part.

The catalysts were aged according to a 2-mode accelerated aging cycle simulating 50,000 miles of driving a car and then tested on a bench reactor with simulated car exhaust. The transient conversion efficiencies of $NO_x$, CO and HC, at 400° C. and 12,000 $hr^{-1}$ space velocity, were measured as 81%, 86% and 95%, respectively.

EXAMPLE 27

In this example, high surface area inert powders were used to support an efficient low-cost catalyst. A single-phase perovskite material $Ln_{0.8}Sr_{0.2}Mn_{0.9}Ni_{0.04}Pd_{0.06}O_3$ was synthesized by dissolving 100 g of mixed hydrated lanthanide carbonate and 400 g of malic acid in a solution formed by dissolving 121.14 g of hydrated manganese nitrate, 19.84 g of strontium nitrate, 29.76 g of 10.0 wt % Pd nitrosyl nitrate solution and 5.46 g of nickel nitrate hexahydrate and 2 liters of water. The solution was dried and beat-treated at 800° C. for 16 hrs. in air. The single-phase powder was then formed into a slurry by methods well known in the art, being mixed and milled with water, gamma-alumina, ceria-zirconia ($Ce_{1-x}Zr_xO_2$) and Dispural, and coated onto a cells-per-square-inch metal honeycomb substrate. The ratio of the four solid ingredients in the slurry was: perovskite/alumina/ceria-zirconia/dispural=8/70/20/2 wt %. After drying, the coated honeycomb was heat-treated at 700° C. for 2 hrs. The loading of solids per liter of honeycomb was in the range 70–200 g. The three-way performance in perturbed exhaust gas streams, space velocity 80,000 $hr^{-1}$, with stoichiometric average air-fuel ratios at 400° C. after high temperature aging, is given by 87.4% $NO_x$, 95.1% CO and 88.2% THC.

EXAMPLE 28

A washcoat was formed onto a cordierite honeycomb support with 600 cells-per-square-inch consisting of ceria-zirconia (25 wt % zirconia) and gamma alumina in the weight ratio of 1:5. The washcoat loading was in the range 50–250 g per liter. A solution with the cation composition $Ln_{0.5}Sr_{0.5}Mn_{0.95}Pt_{0.05}$ (containing 100 g malic acid per liter of solution) was impregnated into the washcoated honeycombs and the channels blown clear of excess. The parts were dried and heat-treated at temperatures in the range of 500–1000° C. The perovskite catalyst loading was in the 2–12 g/L range in the final part.

The catalysts were aged according to a 4-mode accelerated aging cycle simulating 100,000 miles of driving a car. The emissions from the tailpipe of a 4-cylinder gasoline powered automobile were 0.06 g/mile hydrocarbons, 1.3 g/mile CO and 0.12 g/mile $NO_x$. These emissions correspond to reductions compared to those from the tailpipe of 95% HC, 93% CO and 78% $NO_x$ over the Federal Test Procedure drive cycle.

EXAMPLE 29

A single-phase perovskite material $Ln_{0.8}Sr_{0.2}Mn_{0.92}Ni_{0.05}Pd_{0.03}O_3$ was synthesized by dissolving the appropriate amounts of mixed hydrated lanthanide carbonate, malic acid, hydrated manganese nitrate, strontium nitrate, Pd nitrosyl nitrate solution and nickel nitrate hexahydrate and 2 liters of water. The solution was dried and heat-treated at 800° C. for 16 hrs. in air. The single-phase powder was then formed into a slurry with water and 5% Dispural, and coated onto a 400 cells-per-square-inch cordierite honeycomb. After drying, the coated honeycomb was heat-treated at 700° C. for 2 hrs. The loading of perovskite was in the range 15–25 g per liter of geometric volume of substrate. With a loading of 21 g/L, the three-way performance at stoichiometric air-fuel ratios at 400° C. is given by 80.4% $NO_x$, 91.1% CO and 84.2% THC.

EXAMPLE 30

A solution of cation composition $Ln_{0.8}Sr_{0.2}Mn_{0.94}Pt_{0.05}Rh_{0.01}O_{3\pm d}$ was formed using the salts mentioned in the previous example, in addition to DPN and rhodium chloride. The solution was impregnated into a washcoat consisting of ceria-zirconia (25 wt % zirconia) and gamma alumina in the weight ratio of 1:5. The washcoat was pre-formed onto a cordierite honeycomb support with 400 cells-per-square-inch with a loading of 125 g per liter. The impregnated part was dried at 150° C. and heat-treated at 650° C. for 5 hrs. The loading of catalyst was measured as 4 g per liter of catalyst. The three-way performance in perturbed exhaust gas streams, space velocity 80,000 hr$^{-1}$, with stoichiometric average air-fuel ratios at 400° C. after high temperature aging is given by 93.4% $NO_x$, 94.1% CO and 87.2% THC.

EXAMPLE 31

A washcoat was formed onto a cordierite honeycomb support with 600 cells-per-square-inch consisting of ceria-zirconia (25 wt % zirconia) and gamma alumina in the weight ratio of 1:5. The washcoat loading was in the range 100–120 g per liter. A solution with the cation composition $Ln_{0.8}Ba_{0.2}Mn_{0.94}Pd_{0.06}$ (containing 100 g malic acid per liter of solution) was impregnated into the washcoated honeycombs and the channels blown clear of excess. The parts were dried and heat-treated at temperatures in the range of 700–750° C. The perovskite catalyst loading was in the 4–6 g/L range in the final part.

The catalysts were aged according to a 4-mode accelerated aging cycle simulating 50,000 miles of driving a car. The light-off temperatures after aging were measured to be 280° C. for HC, 274° C. for CO and 310° C. for $NO_x$.

EXAMPLE 32

In this example, a solution with the cation composition $Ln_{0.5}Sr_{0.5}Mn_{0.98}Rh_{0.02}O_{3\pm d}$ was synthesized. This solution was then impregnated into a gamma-alumina powder previously treated with bastnasite-derived mixed lanthanide nitrate solution and so having the formula $Ln_{0.1}Al_{0.9}O_3$. The powder at incipient wetness was then dried at 85° C. for 5 hrs. and heated at 200° C. for 5 hrs. and then finally at 900° C. for 16 hrs. The mixed powder contained 4 wt % perovskite and possessed a high specific surface area even when heat-treated at 1100° C. for 20 hrs. The powder was then loaded onto a cordierite honeycomb structure by first forming it into a slurry with 4% Dispural and water and acetic acid. The coated honeycombs were loaded to 120 g/L with the composite powder.

The temperature known as the light-off temperature—the temperature above which the catalyst is functioning—was measured for $NO_x$, CO and hydrocarbons as 243° C., 264° C. and 274° C., respectively, for a 100,000 hr$^{-1}$ space velocity.

EXAMPLE 33

In this example, a single-phase perovskite material $Ln_{0.8}Sr_{0.2}Co_{0.9}Ru_{0.1}O_3$ was synthesized by the method described in Example 9. The solution was dried and heat-treated at 800° C. for 16 hrs. in air. The single-phase powder was then formed into a slurry by methods well known in the art, being mixed and milled with water, gamma-alumina, ceria-zirconia ($Ce_{1-x}Zr_xO_2$) and Dispural, and coated onto a 300 cells-per-square-inch metal honeycomb substrate. The ratio of the four solid ingredients in the slurry is being given by: perovskite/alumina/ceria-zirconia/dispural=20/56/20/4 wt %. After drying, the coated honeycomb was heat-treated at 700° C. for 2 hrs. The loading of solids per liter of honeycomb was in the range 70–200 g. The three-way performance in perturbed exhaust gas streams, space velocity 40,000 hr$^{-1}$, with stoichiometric average air-fuel ratios at 550° C. after high temperature aging is given by 89.4% $NO_x$, 93.1% CO and 90.2% THC.

EXAMPLE 34

In this example, a single-phase perovskite material $Ln_{0.8}Sr_{0.2}Mn_{0.9}Ru_{0.1}O_3$ was synthesized by the method described in Example 8. The solution was dried and heat-treated at 800° C. for 16 hrs. in air. The single-phase powder was then formed into a slurry by methods well known in the art, being mixed and milled with water, gamma-alumina, ceria-zirconia ($Ce_{1-x}Zr_xO_2$) and Dispural, and coated onto a 300 cells-per-square-inch metal honeycomb substrate. The ratio of the four solid ingredients in the slurry is being given by: perovskite/alumina/ceria-zirconia/dispural=15/60/20/5 wt %. After drying, the coated honeycomb was heat-treated at 750° C. for 2 hrs. The loading of solids per liter of honeycomb was in the range 100–150 g. The three-way performance in perturbed exhaust gas streams, space velocity 40,000 hr$^{-1}$, with stoichiometric average air-fuel ratios at 500° C. after high temperature aging is given by 91.4% $NO_x$, 83.0% CO and 86.2% THC.

EXAMPLE 35

A washcoat was formed onto a cordierite honeycomb support with 600 cells-per-square-inch consisting of ceria-zirconia (25 wt % zirconia) and gamma alumina in the weight ratio of 1:5. The washcoat loading was in the range 50–250 g per liter. A solution with the cation composition $Ln_{0.5}Sr_{0.5}Mn_{0.95}Pd_{0.05}$ (containing 100 g malic acid per liter of solution) was impregnated into the washcoated honeycombs and the channels blown clear of excess. The parts were dried and heat-treated at temperatures in the range of 600–1000° C. The perovskite catalyst loading was in the 2–12 g/L range in the final part. A second solution with the cation composition $Ln_{0.5}Sr_{0.5}Co_{0.95}Ru_{0.05}$ (containing 100 g malic acid per liter of solution) was impregnated into the washcoated and solution-impregnated honeycombs and the channels blown clear of excess. The parts were dried and heat-treated at temperatures in the range of 600–1000° C. The second perovskite catalyst loading was in the 4–10 g/L range in the final part.

The catalysts were aged according to a 4-mode accelerated aging cycle simulating 50,000 miles of driving a car. The emissions from the tailpipe of a 4-cylinder gasoline powered automobile were 0.09 g/mile hydrocarbons, 1.6 g/mile CO and 0.09 g/mile $NO_x$.

This catalyst also displayed good poison resistance to sulfur, maintaining stoichiometric and rich-of-stoichiometric $NO_x$ conversion efficiency in excess of 99% at 500° C.

EXAMPLE 36

This example shows that a non-perovskite-type catalyst may be impregnated into a washcoat containing a perovskite-type catalyst. In this example, a non-perovskite-type catalyst of formula $Sr_2Pd_{0.1}O_x$ is impregnated into a pre-formed carrier coating comprising a perovskite-type material $Ln_{0.5}Sr_{0.5}MnO_3$. The carrier coating also contains $Ce_{0.68}Zr_{0.32}O_2$ and gamma-alumina. The ratio of the three constituents of the coating is 20 wt % $Ln_{0.5}Sr_{0.5}MnO_3$, 20 wt % $Ce_{0.68}Zr_{0.32}O_2$ and 60 wt % gamma-alumina. The carrier coating is formed onto a ceramic honeycomb with a cell density of 400 cells-per-square-inch at a loading of 120 g per liter of substrate by the slurry-coating technique well known in the art. A nitrate solution with the cation composition $Sr_2Pd_{0.1}$ is formed from the appropriate nitrate precursors and water. The catalyst solution is then impregnated into the coated honeycomb, dried and calcined at 800° C. for 2 hrs. The Pd concentration in the heat-treated catalyst is 0.2 g per liter. The three-way performance at stoichiometric air-fuel ratios at 400° C. after aging at 950° C. for 20 hrs. is given by 90.4% $NO_x$, 98.2% CO and 96.3% THC.

EXAMPLE 37

A washcoat was formed onto a cordierite honeycomb support with 300-cells-per-square-inch consisting of ceria-zirconia (25 wt % zirconia) and gamma alumina in the weight ratio of 1:5. The washcoat loading was in the range 120–140 g per liter. A solution with the cation composition $Ln_{0.5}Sr_{0.5}Mn_{0.95}Pd_{0.05}$ (containing 100 g malic acid per liter of solution) was impregnated into the washcoated honeycombs and the channels blown clear of excess. The parts were dried and heat-treated at temperatures in the range of 700–900° C. The perovskite catalyst loading was in the 4–6 g/L range in the final part. A second solution with the cation composition $Ln_{0.5}Sr_{0.5}Mn_{0.95}Ru_{0.05}$ (containing 100 g malic acid per liter of solution) was impregnated into the washcoated and solution-impregnated honeycomb and the channels blown clear of excess. The parts were dried and heat-treated at temperatures in the range of 700–800° C. The second perovskite catalyst loading was in the 3–4 g/L range in the final part.

The catalysts were aged according to a 2-mode, fuel-cut, accelerated aging cycle simulating 50,000 miles of driving a car. The three-way conversion efficiency at typical operating temperatures was measured as 98.1% hydrocarbons, 91.2% CO and 96.7% $NO_x$.

This catalyst also displayed good poison resistance to sulfur, maintaining stoichiometric and rich-of-stoichiometric $NO_x$ conversion efficiency in excess of 95% at 500° C.

Three-Way Catalytic Activities of Perovskite Materials of the Present Invention

EXAMPLE 38

Figure 3:
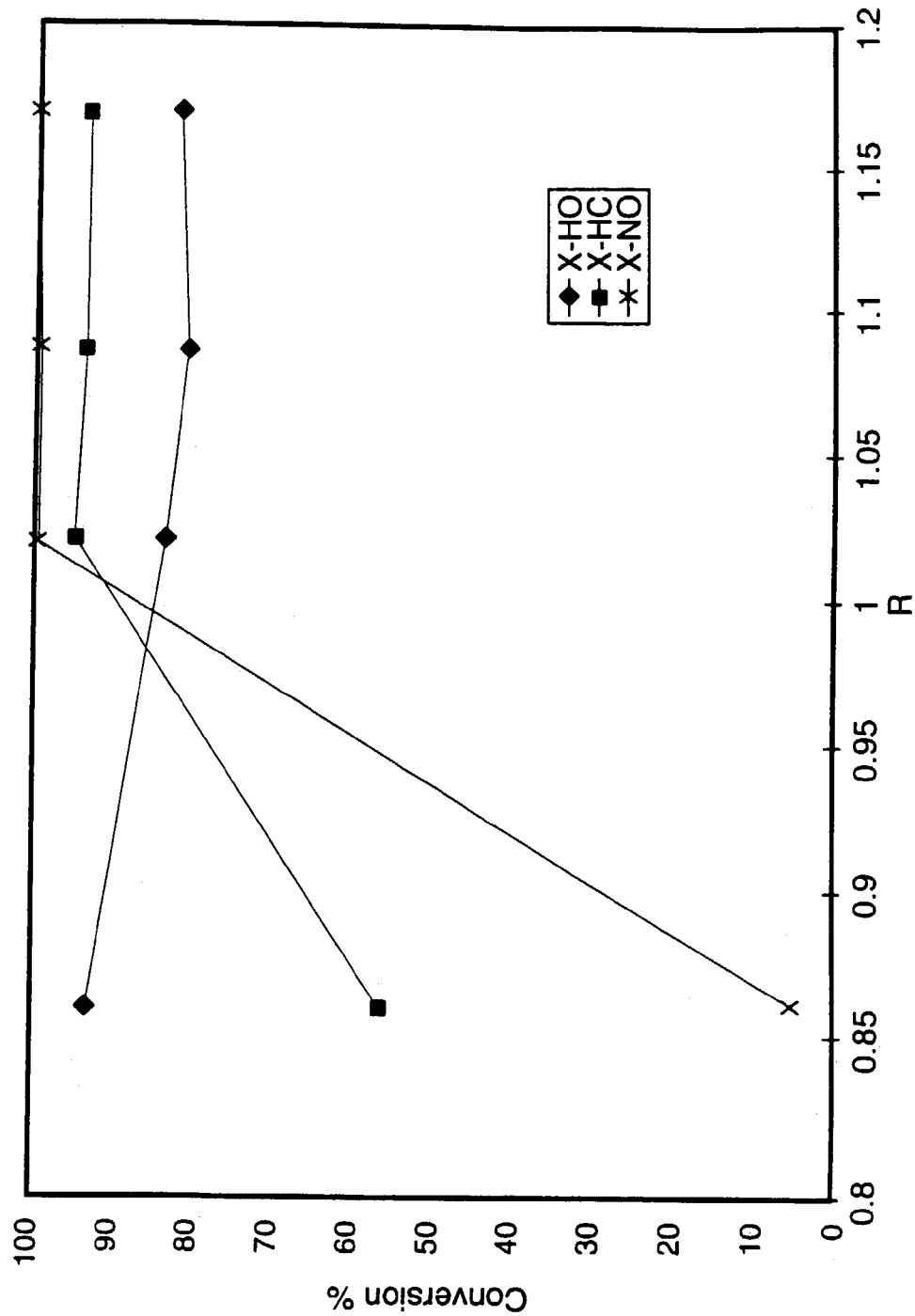
FIG. 3 shows three-way catalytic activities of a perovskite material of the present invention.

Perovskite-type materials made according to the present invention are measured for their three-way catalytic activities. FIG. 3 shows the conversion percentages, catalyzed by a perovskite material of composition $Ln_{0.8}K_{0.2}Mn_{0.95}Ru_{0.05}O_3$ as described in Example 9, for the conversion of NO, HC and CO from a gas mixture simulating automobile exhausts with varying oxygen content. The space velocity of the gas was 33,000 $h^{-1}$ and the temperature of the perovskite catalyst bed was held at a temperature of 550° C. The redox potential of the gas, R, is approximated by $\{3C_{HC}+C_{CO}\}/\{C_{NO}+2C_{O2}\}$, wherein C represents the concentration of the gases. In general, when R>1, the gas is classified as a reducing gas which is generated by a fuel-rich rich exhaust. When R<1, the gas is classified as an oxidizing gas which is generated by fuel-lean exhaust. In addition to these four gases, namely CO, $C_3H_6$, NO and $O_2$, carbon dioxide and steam were also present in the gas mixture.

For a gas mixture which is typical of engine exhaust from the middle of the range of air-fuel ratios (R=1.02), the material shows good three-way conversion. Conversions of CO, NO and HC were 83.1, 94.4 and 99.6 respectively. With fuel-rich gases (R=1.086, R=1.17) the material also displayed excellent three-way conversion. This is unusual and is a unique feature of the mixed-valence oxide materials, and is also related to the Ce on the A-site for fuel-rich gases. The conversion of CO dropped fractionally below 80%, the conversion of the HC was above 90% and the conversion of NO approached 100% (the output NO level was measured less than 10 ppb). For gases simulating lean fuel-air mixtures (R=0.86) the NO conversion was below 10%. The CO conversion was above 90% and the HC conversion was above 50%. The low conversion of NO in oxidizing gases is well known and is a direct consequence of the fundamental nature of the NO reduction process and the redox potential of this gas.

The whole data set was highly reproducible; the gas mixture could be cycled between "rich" (R=1.17) and "lean" (R=0.86) with repeatable conversions for all three critical gases. In addition, the conversion performance for a particular gas (a given R) was not a function of the history of the sample testing, e.g., which type of gas was run first etc. This is significant since a lot of the previous work on these types of materials were plagued by hysterisis effects. Such effects would preclude any realistic application of these materials in technological applications.

In conclusion, FIG. 3 shows that the material made according to the present invention is active as a "three-way catalyst" with particularly effective performance at the rich end of the operating window (commonly used in closed-loop, three-way catalytic converters). This superior rich performance is attributed to the presence of a mixed lanthanide A-site in the perovskite; in particular, it can be attributed to the presence of Ce on the A-site of the perovskite phase. It is understood that the materials made according to the present invention contain at least about 4% of $CeO_2$ on a LnO basis.

EXAMPLE 39

The temperature at which catalytic converter materials become active is very important technologically and is commonly referred to as the "light-off" temperature. The catalytic activity of the material is monitored as the catalyst bed is progressively heated up from ambient temperatures.

Figure 4:
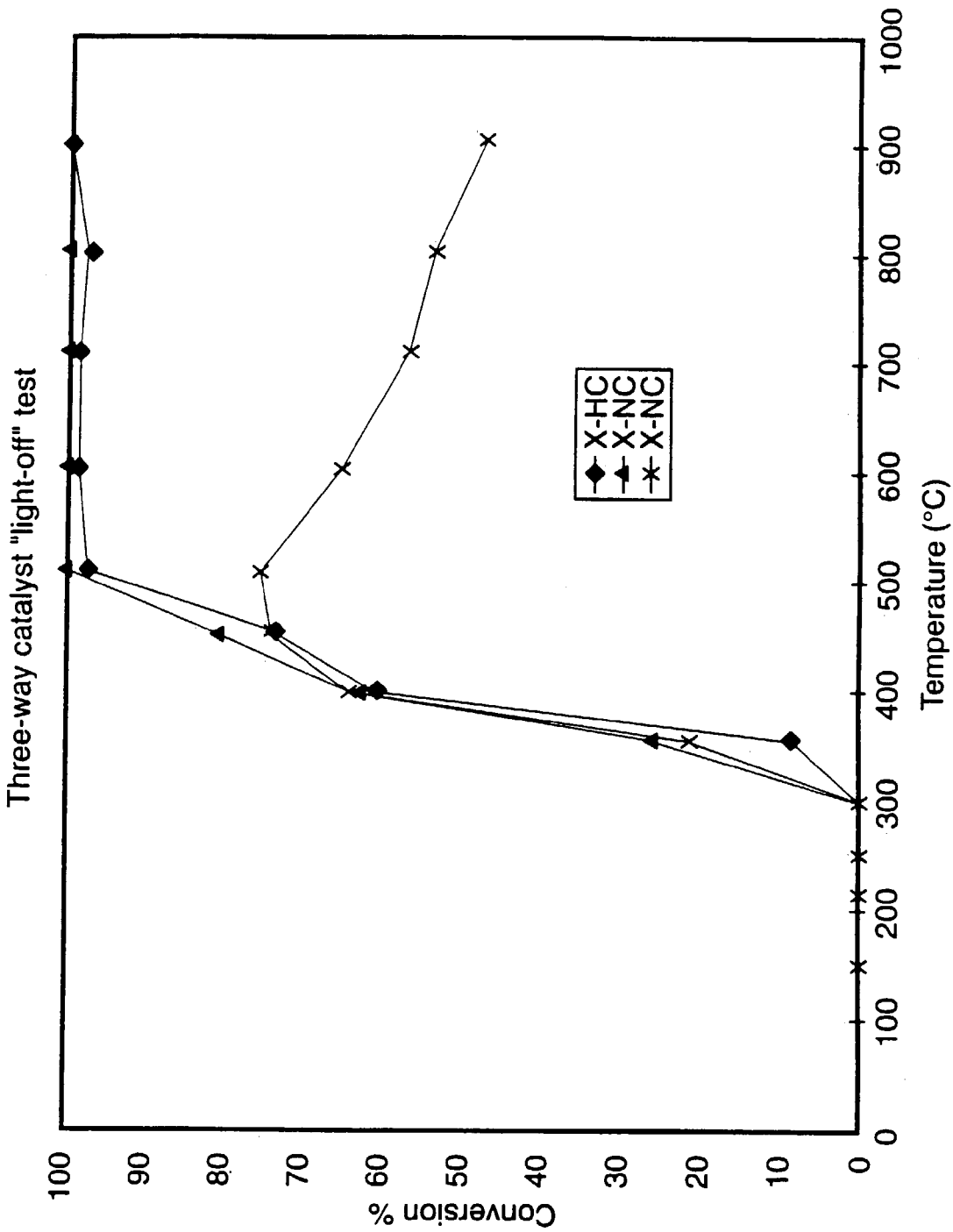
FIG. 4 shows three-way catalyst "light off" test.

FIG. 4 shows the light-off behavior of the material for a reducing gas mixture (R=1.17) with a space velocity of 61,300 $h^{-1}$. At temperatures below 300° C. the material showed no conversion activity. In the temperature window of 300° C. to 400° C., there was a rapid increase of conversion activity with temperature. At 500° C. and above, conversion activities for NO and HC were high (greater than 99.9% and 97.0%, respectively). This high activity was maintained up to the maximum testing temperature of 900° C. The CO conversion activities were slightly lower than the levels measured in the previous test (FIG. 3: conversion of CO at T=550° C. and R=1.17 was measured at 82.1%, whereas the corresponding conversion in this test, FIG. 4, is approximately 75%). There is a significant decrease in CO conversion activity as temperatures are increased above 500° C. One possible cause of this decrease in CO conversion activity is the relatively high space velocity used in these measurements compared to that used in the earlier measurements (61,300 $h^{-1}$ vs. 33,000 $h^{-1}$).

In conclusion, FIG. 4 shows that (1) the catalytic activity of the material is good at high temperatures (900° C.), and (2) there is appreciable activity significantly below the usual operating temperature range for a traditional catalytic converter (500° C.–700° C.). In other words, the material shows a considerable cold-start function.

EXAMPLE 40

Figure 5:
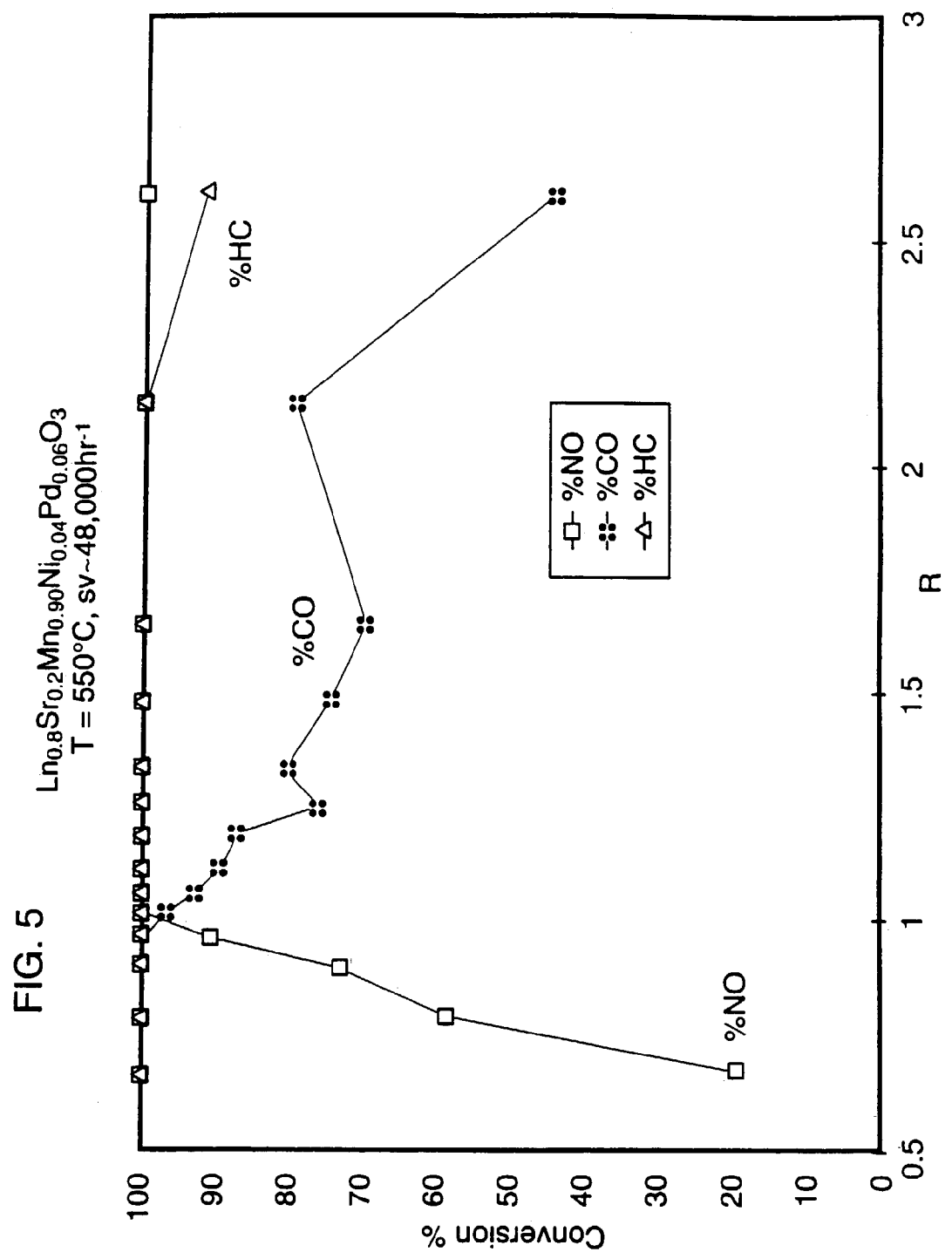
FIG. 5 shows the three-way catalytic activity of the perovskite-based catalyst of composition $Ln_{0.8}Sr_{0.2}Mn_{0.9}Ni_{0.04}Pd_{0.06}O_3$ in an exhaust gas stream.

The composition of Example 15 was tested for its three-way catalytic conversion activity in a gas that closely simulates automobile exhaust. FIG. 5 shows the three-way activity for 0.5 g (occupying about 1 cc in volume) of the above perovskite composition in an exhaust gas flow rate of approximately 1 liter/min. The gas composition was 150 cc/min steam, 210 cc/min carbon dioxide, 13.5 cc/min CO, 1.5 cc/min NO, 0.75 cc/min propene and variable oxygen content. The oxygen content was varied to explore the conversion efficiency over a wide range of redox potential, R. The bed temperature was 550° C.

It is clear that the catalyst is an efficient three-way converter over a wide redox window. Therefore, it is very suitable for use in a three-way catalytic converter for the conversion of toxic emissions in combustion engine exhausts.

EXAMPLE 41

Figure 6:
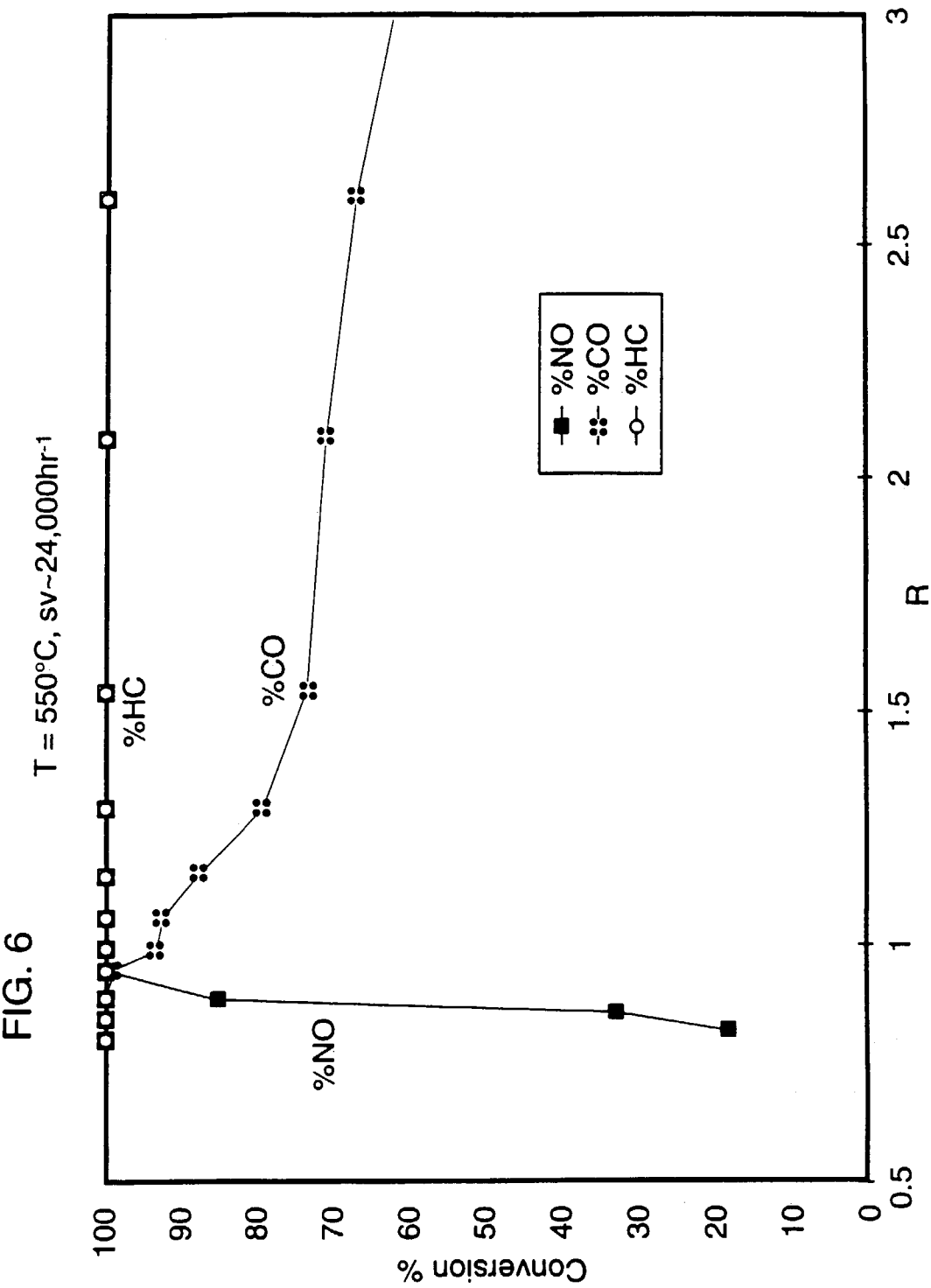
FIG. 6 shows the three-way catalytic activity of the perovskite-based catalyst of composition $Ln_{0.8}Sr_{0.2}Mn_{0.9}Ni_{0.04}Ru_{0.06}O_3$ in an exhaust gas stream.

This composition of Example 17 was tested for its three-way catalytic conversion activity in a gas that closely simulates automobile exhaust. FIG. 6 shows the three-way activity for 0.5 g (occupying about 1 cc in volume) of the above perovskite composition in an exhaust gas flow rate of approximately 1 liter/min. The gas composition was 150 cc/min steam, 210 cc/min carbon dioxide, 13.5 cc/min CO, 1.5 cc/min NO, 0.75 cc/min propene and variable oxygen content. The oxygen content was varied to explore the conversion efficiency over a wide range of redox potential, R. The bed temperature was 550° C. The catalyst was found to have good three-way conversion activity over a range of redox potentials. It is clear that the catalyst is an efficient three-way converter over a wide redox window, and thus it is very suitable for use in a three-way catalytic converter for the conversion of toxic emissions in combustion engine exhausts.

The excellent thermal stability of this composition was shown by x-ray diffraction (XRD) on powder samples before and after treatment in the reducing exhaust gas at 1000° C. for 5 hours. There was no noticeable decomposition of the perovskite phase to reduced perovskite phases or decomposition of the perovskite phase altogether.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A method of reducing nitrogen oxides, oxidizing carbon monoxide, and oxidizing hydrocarbons in an exhaust stream from a motor vehicle, said method comprising: contacting the exhaust stream with a perovskite-type catalyst consisting essentially of a metal oxide composition represented by the general formula:

$A_{a-x}B_xMO_b$ wherein

A is a mixture of elements originally in the form of a single phase mixed lanthanide collected from bastnasite;

B is a divalent or monovalent cation;

M is at least one element selected from the group consisting of elements of an atomic number of from 22 to 30, 40 to 51, and 73 to 80;

a is 1 or 2;

b is 3 when a is 1 or b is 4 when a is 2; and x is a number defined by $0 \leq x < 0.7$.

2. The method of claim 1, wherein A comprises elements selected from the group consisting of lanthanides having an atomic number of from 57 to 71.

3. The method of claim 1, wherein B is selected from the group consisting of Ca, Sr, and K.

4. The method of claim 1, wherein M is selected from the group consisting of Fe, Mn, Co, Ni, Ru, Cr, and mixtures thereof.

5. The method of claim 1, wherein the perovskite-type catalyst is selected from the group consisting of $Ln_{0.6}Ca_{0.4}CoO_3$, $Ln_{0.83}Sr_{0.17}MnO_3$, $Ln_{0.7}Sr_{0.3}CrO_3$, $Ln_{0.6}Ca_{0.4}Fe_{0.8}Mn_{0.2}O_3$, $Ln_{0.8}Sr_{0.2}Mn_{0.9}Ni_{0.04}Ru_{0.06}O_3$, $Ln_{0.8}K_{0.2}Mn_{0.95}Ru_{0.05}O_3$, $Ln_{0.7}Sr_{0.3}Cr_{0.95}Ru_{0.05}O_3$, $LnNiO_3$, $Ln_2(Cu_{0.6}Co_{0.2}Ni_{0.2})O_4$, $Ln_{0.6}Ca_{0.4}Fe_{0.8}Mn_{0.2}O_3$, $Ln_{0.8}Sr_{0.2}Mn_{0.9}Ni_{0.04}Pd_{0.06}O_3$, $Ln_{0.8}Sr_{0.2}Mn_{0.9}Ni_{0.04}Pt_{0.06}O_3$, $Ln_{0.7}Sr_{0.3}Mn_{0.9}Ni_{0.04}Ru_{0.06}O_3$, $LnMn_{0.5}Cu_{0.5}O_3$, $LnMn_{0.8}Ni_{0.10}Cu_{0.10}O_3$, $Ln_{0.7}Sr_{0.3}Mn_{0.9}Pd_{0.1}O_3$, $Ln_{0.5}Sr_{0.5}Mn_{0.9}Pd_{0.1}O_3$, $Ln_{0.8}Sr_{0.2}MnO_3$, $Ln_{0.5}Sr_{0.5}Mn_{0.98}Pd_{0.02}O_3$, $Ln_{0.8}Sr_{0.2}Mn_{0.96}Pd_{0.04}O_3$, $Ln_{0.5}Sr_{0.5}Mn_{0.95}Pt_{0.05}O_3$, $Ln_{0.8}Sr_{0.2}Mn_{0.92}Ni_{0.05}Pd_{0.03}O_3$, $Ln_{0.8}Sr_{0.2}Mn_{0.94}Pt_{0.05}Rh_{0.01}O_3$, $Ln_{0.8}Ba_{0.2}Mn_{0.94}Pd_{0.06}O_3$, $Ln_{0.5}Sr_{0.5}Mn_{0.98}Rh_{0.02}O_3$, $Ln_{0.8}Sr_{0.2}Co_{0.9}Ru_{0.1}O_3$, $Ln_{0.8}Sr_{0.2}Mn_{0.9}Ru_{0.1}O_3$, $Ln_{0.5}Sr_{0.5}Mn_{0.95}Pd_{0.05}O_3$, $Ln_{0.5}Sr_{0.5}Mn_{0.95}Ru_{0.05}O_3$, and $Ln_{0.5}Sr_{0.5}MnO_3$, where Ln is a mixture of lanthanides originally in the form of a single phase mixed lanthanide collected from bastnasite.

6. The method of claim 1, wherein said contacting is at a temperature between 300° C. and 900° C.

7. The method of claim 1, wherein said contacting is at a temperature between 500° C. and 700° C.

8. The method of claim 1, wherein said exhaust stream has a redox potential R that is in the range of between about 0.86 and about 1.17 during said contacting.

9. The method of claim 1, wherein said catalyst is supported on a structure.

10. The method of claim 9, wherein said structure is a honeycomb support.

11. The method of claim 10, wherein said honeycomb support is a ceramic honeycomb support or a metal honeycomb support.

12. The method of claim 9, wherein said structure is in a form of beads or pellets.

13. The method of claim 9, wherein a carrier material or a mixture of carrier materials is deposited onto the support structure, thereby forming a washcoat on the surface of the support structure.

14. The method of claim 13, wherein a solution of salts of element A and salts or oxides of elements B and M is impregnated into said washcoat.

15. The method of claim 14, wherein the impregnated washcoat is died and calcined to form the perovskite-type catalyst in the form of a dispersion.

16. The method of claim 1, wherein said perovskite-type catalyst is a three-way catalyst.

17. A method of purifying industrial process emissions containing hydrocarbons, carbon monoxide, and nitrogen oxides, the method comprising:contacting said emissions with a perovskite-type catalyst, thereby purifying said emissions, said perovskite-type catalyst consisting essentially of a metal oxide composition represented by the general formula:

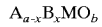

wherein A is a mixture of elements originally in the form of a single phase mixed lanthanide collected from bastnasite;

B is a divalent or monovalent cation;

M is at least one element selected from the group consisting of elements of an atomic number of from 22 to 30, 40 to 51, and 73 to 80;

a is 1 or 2;

b is 3 when a is 1 or b is 4 when a is 2; and x is a number defined by $0 \leq x < 0.7$.

18. The method of claim 17, wherein purifying said exhaust gas comprises reducing the nitrogen oxides and oxidizing the carbon monoxide and hydrocarbons in the exhaust gas.

19. The method of claim 17, wherein said contacting is at a temperature between 300° C. and 900° C.

20. The method of claim 17, wherein the emissions have a redox potential R in the range of between about 0.86 and 1.17 during said contacting.

* * * * *